(12) United States Patent
Suga

(10) Patent No.: US 8,521,165 B2
(45) Date of Patent: Aug. 27, 2013

(54) METHOD OF DISTRIBUTING LOAD AND BASE STATIONS

(75) Inventor: Junichi Suga, Kawaski (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 13/288,224

(22) Filed: Nov. 3, 2011

(65) Prior Publication Data

US 2012/0115541 A1   May 10, 2012

(30) Foreign Application Priority Data

Nov. 5, 2010 (JP) ................. 2010-248651

(51) Int. Cl.
*H04W 36/00* (2009.01)
*H04W 72/00* (2009.01)

(52) U.S. Cl.
USPC .......................... 455/436; 455/453

(58) Field of Classification Search
USPC .............. 455/436–444, 434, 450, 453
See application file for complete search history.

(56) References Cited

U.S. PATENT DOCUMENTS

| 2006/0142021 A1* | 6/2006 | Mueckenheim et al. ..... 455/453 |
| 2011/0086641 A1* | 4/2011 | Guvenc et al. .................. 455/437 |
| 2012/0071160 A1* | 3/2012 | Das et al. ....................... 455/434 |

FOREIGN PATENT DOCUMENTS

| JP | 2009-147531 A | 7/2009 |
| JP | 2009-284432 A | 12/2009 |

OTHER PUBLICATIONS

3GPP TR 36.902 V9.2.0, 3rd Generation Partnership Project; Technical Specification Group Radio Access Network; Evolved Universal Terrestrial Radio Access Network (E-UTRAN); Self-configuring and self-optimizing network (SON) use cases and solutions (Release 9); Jun. 15, 2010, pp. 1-21.
Nasri, Ridha et al., "Handover Adaptation for Dynamic Load Balancing in 3GPP Long Term Evolution Systems", Proceedings of MoMM2007; Dec. 1, 2007, pp. 145-153.

* cited by examiner

*Primary Examiner* — Michael Faragalla
(74) *Attorney, Agent, or Firm* — Fujitsu Patent Center

(57) ABSTRACT

A method including: setting a first index value and a second index value representing levels of received power or received quality of reference signals from a first base station and a second base station; handing over a mobile station assigned to the first base station to the second base station when the first index value is smaller than a first threshold and when the second index value is larger than a second threshold; handing over a mobile station assigned to the second base station to the first base station when the second index value is smaller than a third threshold or when the first index value is larger than a fourth threshold; and performing adjustment of at least one of the first threshold, the second threshold, the third threshold, and the fourth threshold in accordance with load on the first base station and the second base station.

11 Claims, 42 Drawing Sheets

FIG. 5

| MEAS OBJECT MOD | |
|---|---|
| PARAMETER | DESCRIPTION |
| MEAS OBJECT ID | MEASUREMENT TARGET ID |
| OFFSET FREQ | FREQUENCY OFFSET |
| CELLS MOD LIST | CellsMod LIST |
| REPORT CONFIG MOD | |
| PARAMETER | DESCRIPTION |
| REPORT CONFIG ID | REPORT CONFIGURATION ID |
| THRESHOLED_P1 | THRESHOLD 1 OF MEASUREMENT REPORT TRANSMISSION CONDITIONS |
| THRESHOLED_P2 | THRESHOLD 2 OF MEASUREMENT REPORT TRANSMISSION CONDITIONS |
| HYSTERESIS | HYSTERESIS |
| MEAS ID MOD | |
| PARAMETER | DESCRIPTION |
| MEAS ID | MEASUREMENT ID |
| MEAS OBJECT ID | MEASUREMENT TARGET ID |
| REPORT CONFIG ID | REPORT CONFIGURATION ID |
| CELLS MOD | |
| PARAMETER | DESCRIPTION |
| CELL ID | MEASUREMENT TARGET CELL ID |
| CELL INDIVIDUAL OFFSET_P1 | INDIVIDUAL OFFSET 1 OF MEASUREMENT TARGET CELL |
| CELL INDIVIDUAL OFFSET_P2 | INDIVIDUAL OFFSET 2 OF MEASUREMENT TARGET CELL |

FIG. 24

| MEAS OBJECT MOD | |
|---|---|
| PARAMETER | DESCRIPTION |
| MEAS OBJECT ID | MEASUREMENT TARGET ID |
| OFFSET FREQ | FREQUENCY OFFSET |
| CELLS MOD LIST | CellsMod LIST |
| REPORT CONFIG MOD | |
| PARAMETER | DESCRIPTION |
| REPORT CONFIG ID | REPORT CONFIGURATION ID |
| EVENT | TYPE OF MEASUREMENT REPORT TRANSMISSION CONDITION |
| THRESHOLD | THRESHOLD OF MEASUREMENT REPORT TRANSMISSION CONDITIONS, USED WHEN event=A |
| OFFSET | OFFSET VALUE OF MEASUREMENT REPORT TRANSMISSION CONDITIONS, USED WHEN event=B |
| HYSTERESIS | HYSTERESIS |
| MEAS ID MOD | |
| PARAMETER | DESCRIPTION |
| MEAS ID | MEASUREMENT ID |
| MEAS OBJECT ID | MEASUREMENT TARGET ID |
| REPORT CONFIG ID | REPORT CONFIGURATION ID |
| CELLS MOD | |
| PARAMETER | DESCRIPTION |
| CELL ID | MEASUREMENT TARGET CELL ID |
| CELL INDIVIDUAL OFFSET | INDIVIDUAL OFFSET OF MEASUREMENT TARGET CELL |

METHOD OF DISTRIBUTING LOAD AND BASE STATIONS

CROSS-REFERENCE TO RELATED APPLICATIONS

This application is based upon and claims the benefit of priority from the prior Japanese Patent Application No. 2010-248651 filed on Nov. 5, 2010, the entire contents of which are incorporated herein by reference.

FIELD

Embodiments of the present invention relate to a technique to balance load between a base station covering a large area and a base station covering a relatively small area inside the large area.

BACKGROUND

The Third Generation Partnership Project (3GPP) has been reviewing self-organizing networks (SON) aimed for promoting the operational efficiency by automatically setting and optimizing various wireless parameters for Long Term Evolution (LTE), which is a next-generation wireless communication standard. Some SON use cases include mobility load balancing (MLB) in which load, such as wireless resources, is balanced between cells by adjusting handover (HO) parameters between adjoining cells.

There is a known method of adjusting handover parameters for MLB. That is, with the known method of adjusting handover parameters for MLB, handover is triggered by comparing the received power measured by a mobile station that is connected to a serving cell and the received power measured by a mobile station that is connected to an adjoining cell. Specifically, when the received power measured by the mobile station from the adjoining cell is larger than the received power from the serving cell by a value exceeding a threshold T, the mobile station is handed over to a target cell, i.e., adjoining cell. At this time, when MLB is carried out on adjoining cells, the threshold associated with the handover trigger is adjusted.

For example, the initial parameter configuration of handing over a mobile station to cell B when the received power from cell B, which is a cell adjoining a serving cell, is larger than the received power from cell A, which is the serving cell, by a threshold, i.e., 3 dB, is considered. At this time, if the load on cell A is higher than the load on cell B, MLB is carried out, and the threshold is set to, for example, 1 dB. By setting a small threshold, the area covered by cell A decreases and the area covered by cell B increases, promoting handover of the mobile station from cell A to cell B. At the same time, the handover threshold of the mobile station for cell A is updated in cell B. In such a case, in cell B, the large threshold of the received power measured by the mobile station from cell A is set to prevent the mobile station from being handed over from cell B to cell A.

Examples of the related art include: 3GPP TR 36.902 V9.2.0; and R. Nasri and Z. Altman, Handover adaptation for dynamic load balancing in 3GPP long term evolution systems, 5th Int. Conf. on Advanced in Mobile Computing Multimedia (MoMM2007), Jakarta, Indonesia, December 2007.

SUMMARY

According to an aspect of the invention, a method of distributing load in a wireless communication system including a first base station covering a first area and a second base station covering a second area inside the first area, the method including: setting a first index value and a second index value representing levels of received power or received quality of reference signals from the first base station and the second base station; handing over a mobile station assigned to the first base station to the second base station when the first index value is smaller than a first threshold and when the second index value is larger than a second threshold; handing over a mobile station assigned to the second base station to the first base station when the second index value is smaller than a third threshold or when the first index value is larger than a fourth threshold; and performing adjustment of at least one of the first threshold, the second threshold, the third threshold, and the fourth threshold in accordance with load on the first base station and the second base station.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIG. 5 illustrates an example format of measurement report configuration information of the first embodiment.

FIG. 24 illustrates an example format of measurement report configuration information in a second embodiment.

DESCRIPTION OF EMBODIMENTS

Figure 1:
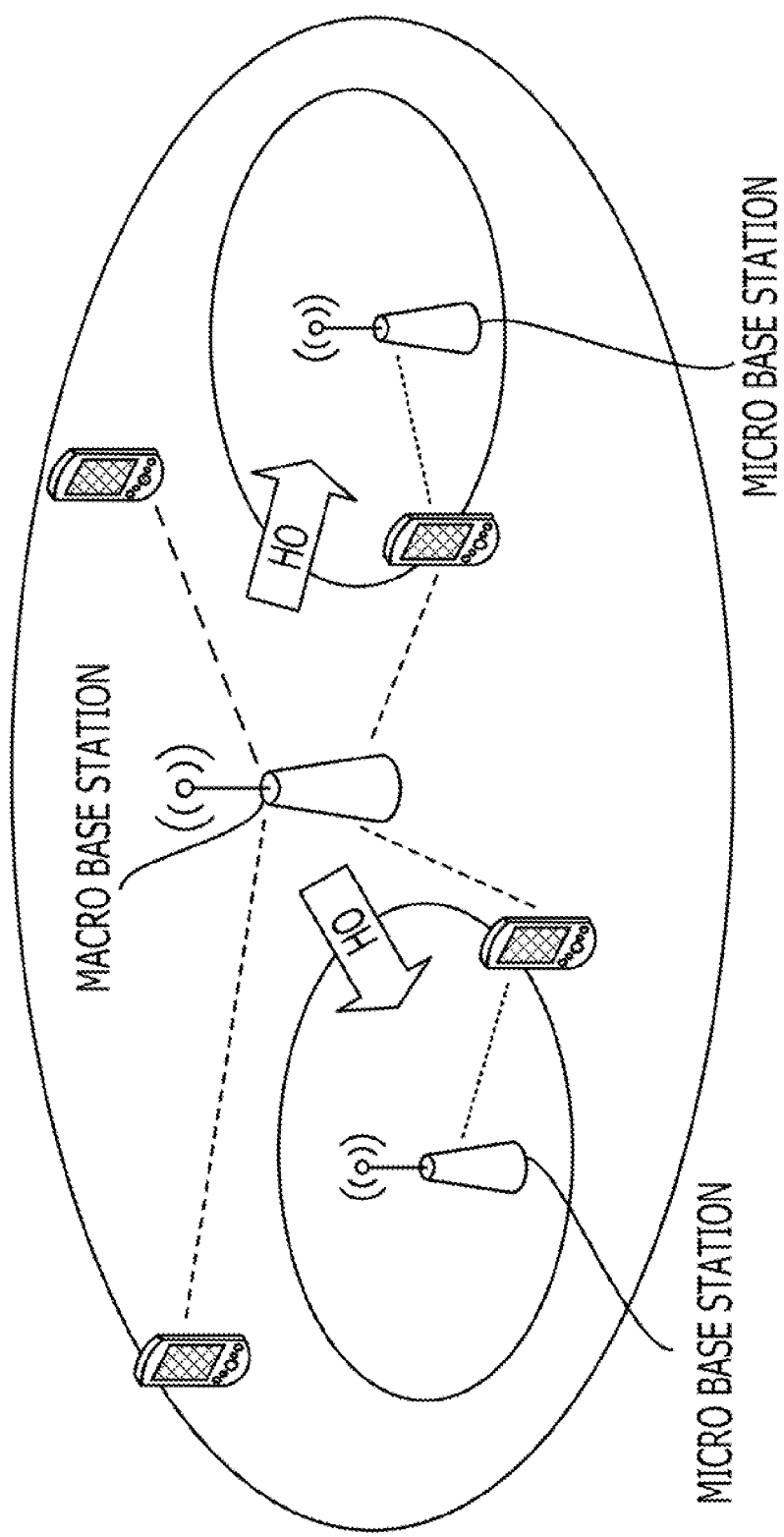
FIG. 1 illustrates a wireless communication system including a macro base station and micro base stations.

As illustrated in FIG. 1, base stations (which are hereinafter referred to as "micro base stations"), which cover microcells having relatively small areas (which are also referred to as "picocells" or "femtocells"), are disposed inside a macrocell, which is a large area covered by a base station (which is hereinafter referred to as "macro base station"). The area of a microcell has, for example, a radius in the range of approximately several hundreds of meters to several tens of kilometers. The area of a microcell has, for example, a radius in the range of several tens to several hundreds of meters. In such a case, MLB may be applied to a wireless communication system in which a micro base station cell or two or more micro base stations of different frequencies are disposed in a macro base station cell, and load balancing may be carried out between the macro base station cell and the micro base station cell(s). At this time, for example, if the load on the macro base station cell is high and the load on the micro base station cell is low, parameters associated with handover of a mobile station from the macro base station cell to the micro base station cell are adjusted to promote handover of the mobile station from the macro base station cell to the micro base station cell. At the same time, parameters associated with handover of a mobile station from the micro base station cell to the macro base station cell are adjusted to prevent handover of the mobile station from the micro base station cell to the macro base station cell.

Figure 2:
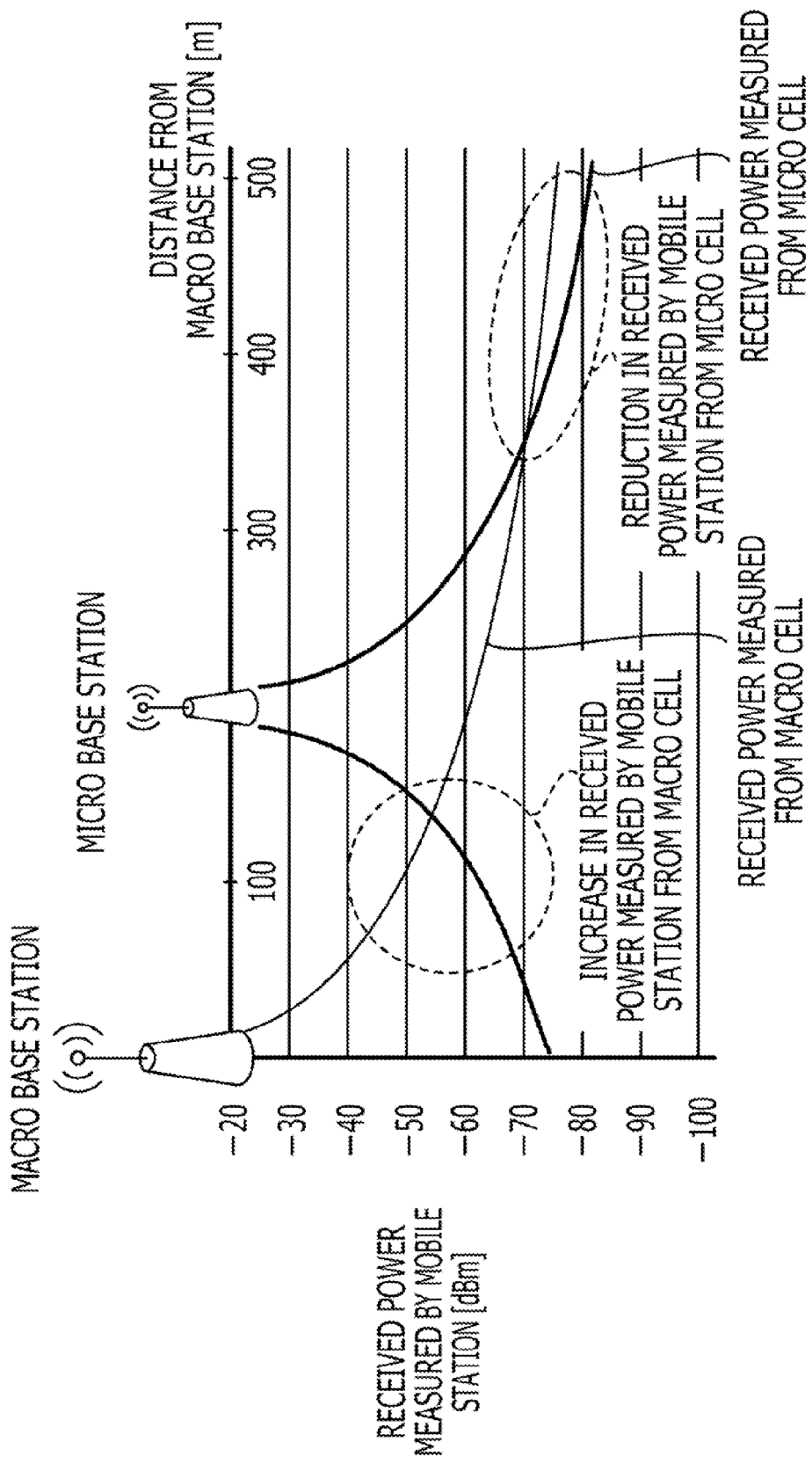
FIG. 2 illustrates variation in received power measured by a mobile station with respect to distance when a micro base station cell is disposed inside a macro base station cell.

FIG. 2 illustrates the variation in received power measured by a mobile station with respect to distance when a micro base station cell is disposed inside a macro base station cell. The horizontal axis in FIG. 2 represents the distance from the macro base station. As an example, in FIG. 2, the macro base station is disposed at the 0 m point, and the micro base station is disposed at the 200 m point. At this time, handover (HO) boundaries between the macro base station cell and the micro base station cell are generated at a point on the left side of the micro base station between the macro base station and the micro base station (near or at the 150 m point) and at a point on the right side of the micro base station (near or at the 350 m point). At the left HO boundary, the received power measured by a mobile station from the macro base station cell increases as the distance from the micro base station increases, causing a large difference between the power received from the macro base station cell and the power received from the micro base station cell. At the HO boundary on the right, the received power measured by a mobile station from the macro base station cell is reduced as the distance from the micro base station cell increases, causing substantially no difference in the electric powers received from the macro base station cell and the power received from the micro base station cell. FIG. 2 illustrates that the received power measured by a mobile station from the macro base station cell and the micro base station cell and the difference in the received electric powers depend on the position of the HO boundary between the macro base station cell and the micro base station cell.

With the related art described above, the following problems occur because there is no consideration of the fact that the power received by a macro base station cell and a micro base station cell and the difference in the received electric powers therebetween depend on the position of the HO boundary between the macro base station cell and the micro base station cell.

That is, with the related art, when the load on the macro base station cell is high and the load is to be moved to the micro base station cell, the threshold for handover from the macro base station cell to the micro base station cell is decreased, and the threshold for handover from the micro base station cell to the macro base station cell is increased. Since the difference in the received power measured by the mobile station from the macro base station cell and the micro base station cell is large on the left side of the micro base station, even when the threshold for handover from the macro base station cell to the micro base station cell is set to a small value, the HO boundary cannot be moved sufficiently to the left (i.e., toward the macro base station). Therefore, the mobile station located near the macro base station cell cannot be handed over to the micro base station cell.

The threshold for handover from the macro base station cell to a micro base station cell may be set to a significantly small value, and the threshold for handover from the micro base station cell to the macro base station cell may be set to a significantly large value, so as to hand over the mobile station located near the macro base station to the micro base station cell. At this time, the electric powers received by the mobile station from the macro base station cell and from the micro base station cell are substantially the same on the right side of the micro base station, causing the HO boundary to move to the extreme right. In such a case, the mobile station is handed over from the micro base station cell to the macro base station cell while receiving weak electric power at the HO boundary on the right side of the micro base station, increasing the probability of communication of the mobile station being cut off.

An aspect of the present invention provides a method of distributing load and base stations that enable appropriate balancing of load in a wireless communication system having a first base station covering a first area and a second base station covering a second area, which is disposed inside the first area.

In the embodiments described below, a macro base station is an example of the first base station, and a micro base station is an example of the second base station. The electric power or reception quality of a reference signal received by a mobile station from a macro base station is an example of a first index value, and the electric power or reception quality of a reference signal received by the mobile station from a micro base station is an example of a second index value.

(A) First Embodiment (A-1) Outline of Method of Distributing Load According to First Embodiment As illustrated in FIG. 1, a wireless communication system of this embodiment includes a macro base station, which covers a large area, and micro base stations, each of which covers a relatively small area inside the area covered by the macro base station. The first embodiment describes a method of distributing load for appropriately balancing the load between the macro base station and the micro base stations.

Figure 3:
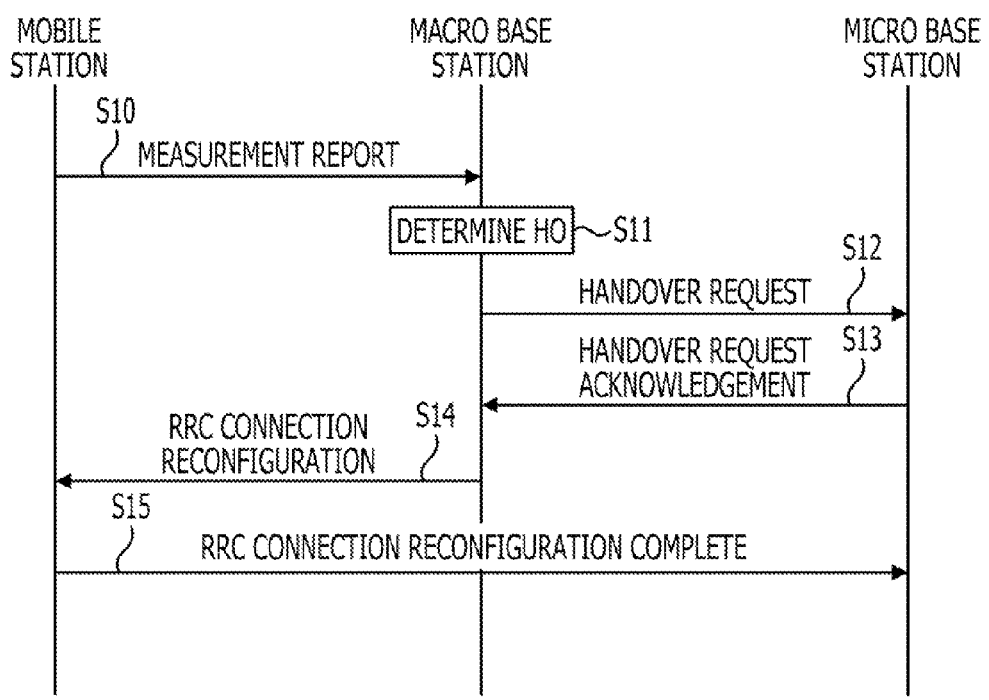
FIG. 3 illustrates a handover sequence from a macro base station cell to a micro base station cell in the wireless communication system of the first embodiment.

With reference to FIG. 3, an example handover sequence carried out between the macro base station and the micro base station will be described. Here, a case in which a mobile station is handed over from the macro base station to the micro base station will be described.

In FIG. 3, the mobile station sends a measurement report message to the macro base station when the results of measuring the received power or received quality of reference signals from a serving cell (which in this case is a macro base station cell) and an adjoining cell (which in this case is a micro base station cell) satisfy the transmission conditions for the measurement report message described below (Step S10). Hereinafter, "measurement report message" may also be simply referred to as "measurement report." When the macro base station that has received the measurement report message determines whether to hand over the mobile station (Step S11), the macro base station sends a handover request message to the micro base station to request handover of the mobile station (Step S12). When the micro base station that has received the handover request message accepts the handover of the mobile station, the micro base station sends a handover-request acknowledgement message to the macro base station (Step S13). After receiving the handover-request acknowledgement message, the macro base station sends an RRC connection reconfiguration message to the mobile station (Step S14). The RRC connection reconfiguration message in FIG. 3 is a handover command for the mobile station and contains information of the target cell, which is the destination of the handover. Upon receiving the RRC connection reconfiguration message, the mobile station refers to the information contained in the message, establishes connection with the micro base station, which is the target cell, and sends an RRC connection reconfiguration complete message to the micro base station (Step S15). Then, the micro base station receives the RRC connection reconfiguration complete message from the mobile station that has been handed over, and the handover sequence ends.

In the description below, to measure "received power or received quality" is to measure "received power or received quality of a predetermined reference signal for a measurement report.

The macro base station determines whether to hand over the mobile station upon receiving a measurement report message from the mobile station. The macro base station may also consider the electric power or the reception quality of the reference signal received by the mobile station from the macro base station cell and the load on the macro base station and/or micro base station. For example, when it is confirmed in advance that the load on the micro base station cell is high, the handover process to the micro base station cell may not be started.

Figure 4:
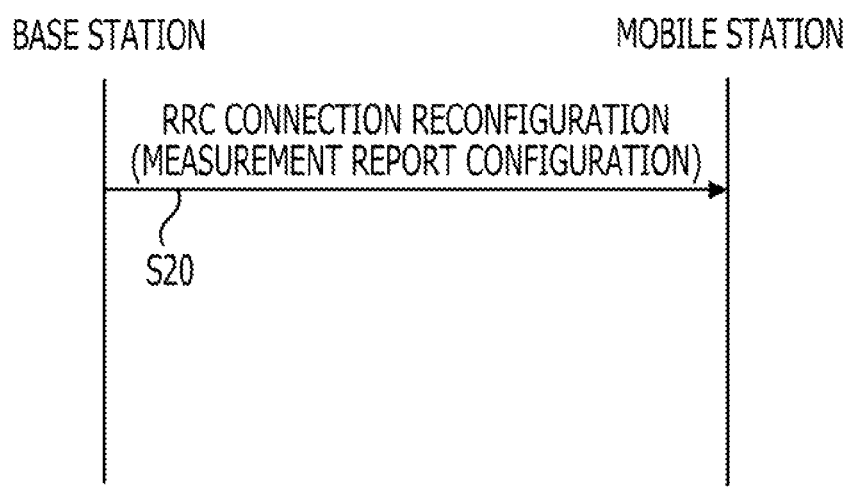
FIG. 4 illustrates an example transmission of a message from a macro base station or a micro base station to a mobile station in the wireless communication system of the first embodiment.

FIG. 4 illustrates an example transmission of an RRC connection reconfiguration message containing measurement report configuration information from the macro base station or the micro base station to the mobile station. The RRC connection reconfiguration message is sent from the macro base station or micro base station (Step S20) when the mobile station connects to the network, when the configuration is changed, or when carrying out handover as illustrated in FIG. 3.

(A-2) Measurement Report Configuration Information

Example measurement report configuration information of this embodiment will be described below with reference to FIGS. 5 to 8.

FIG. 5 illustrates an example format of measurement report configuration information of this embodiment. The measurement report configuration information mainly contains three parts: MeasObjectMod, ReportConfigMod, and MeasIDMod.

MeasObjectMod is set for every frequency to be measured. For example, if cells using different frequencies exist in the vicinity and measurement reports corresponding to these cells are to be acquired from the mobile station, MeasObjectMod is set for each of the frequencies. MeasObjectMod may contain an ID of a target frequency (MeasObjectID), offset of the target frequency (offsetFreq), and a list of information about peripheral cells using the target frequency (CellModList). CellModList contains information about peripheral cells using the target frequency (CellMod). CellMod contains an ID of a cell (CellID) and offset value of the cell (cellIndividualOffset1, cellIndividualOffset2). A method of setting these parameters and a method of controlling the mobile station in accordance with these parameters will be described below.

ReportConfigMod contains information about the measurement report transmission conditions (which will be described below). ReportConfigMod contains an ID for each configuration (ReportConfigID), thresholds for the measurement report transmission conditions (Threshold_p1, Threshold_p2), and Hysteresis of the peripheral cells (Hysteresis). The parameter configuration and the use by a mobile station will be described below.

MeasIDMod applies ReportConfigMod, which is information about the measurement report transmission conditions, to MeasObjectMod, which is information of the measured target. MeasIDMod contains its own ID (MeasID), an ID of MeasObjectMod (MeasObjectID), and an ID of ReportConfigMod (ReportConfigID).

Figure 6:
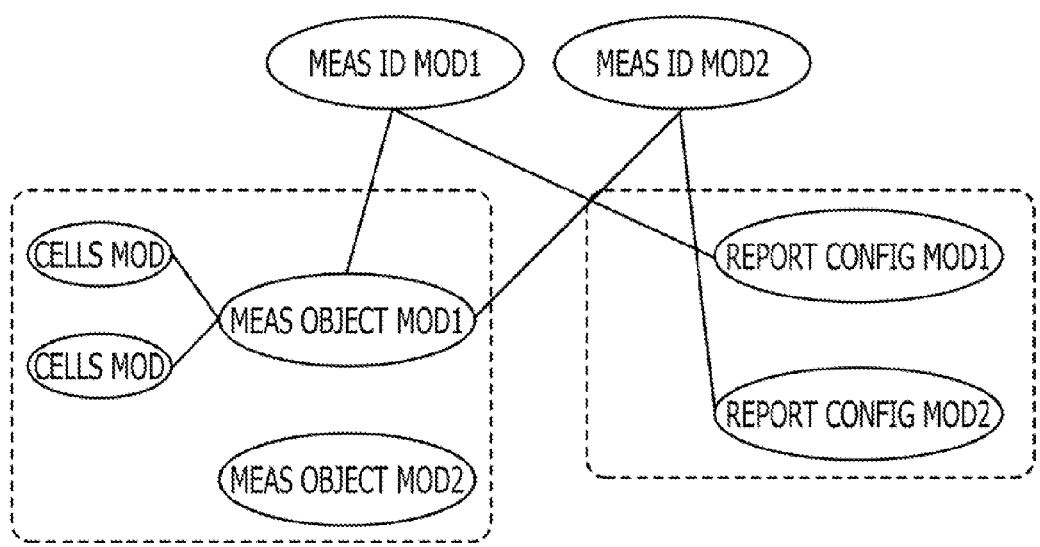
FIG. 6 illustrates the relationship among MeasObjectMod, ReportConfigMod, and MeasIDMod in the measurement report configuration information in FIG. 5.

FIG. 6 illustrates the relationship of MeasObjectMod, ReportConfigMod, and MeasIDMod in the measurement report configuration information. MeasIDMod1 applies ReportConfigMod1 to MeasObjectMod1, and MeasIDMod2 applies ReportConfigMod2 to MeasObjectMod1. In this way, it is possible to set multiple sets of ReportConfigMod for MeasObjectMod. The mobile station measures the received power or the received quality on the basis of the measurement report configuration information and sends a measurement report message.

Figure 7:
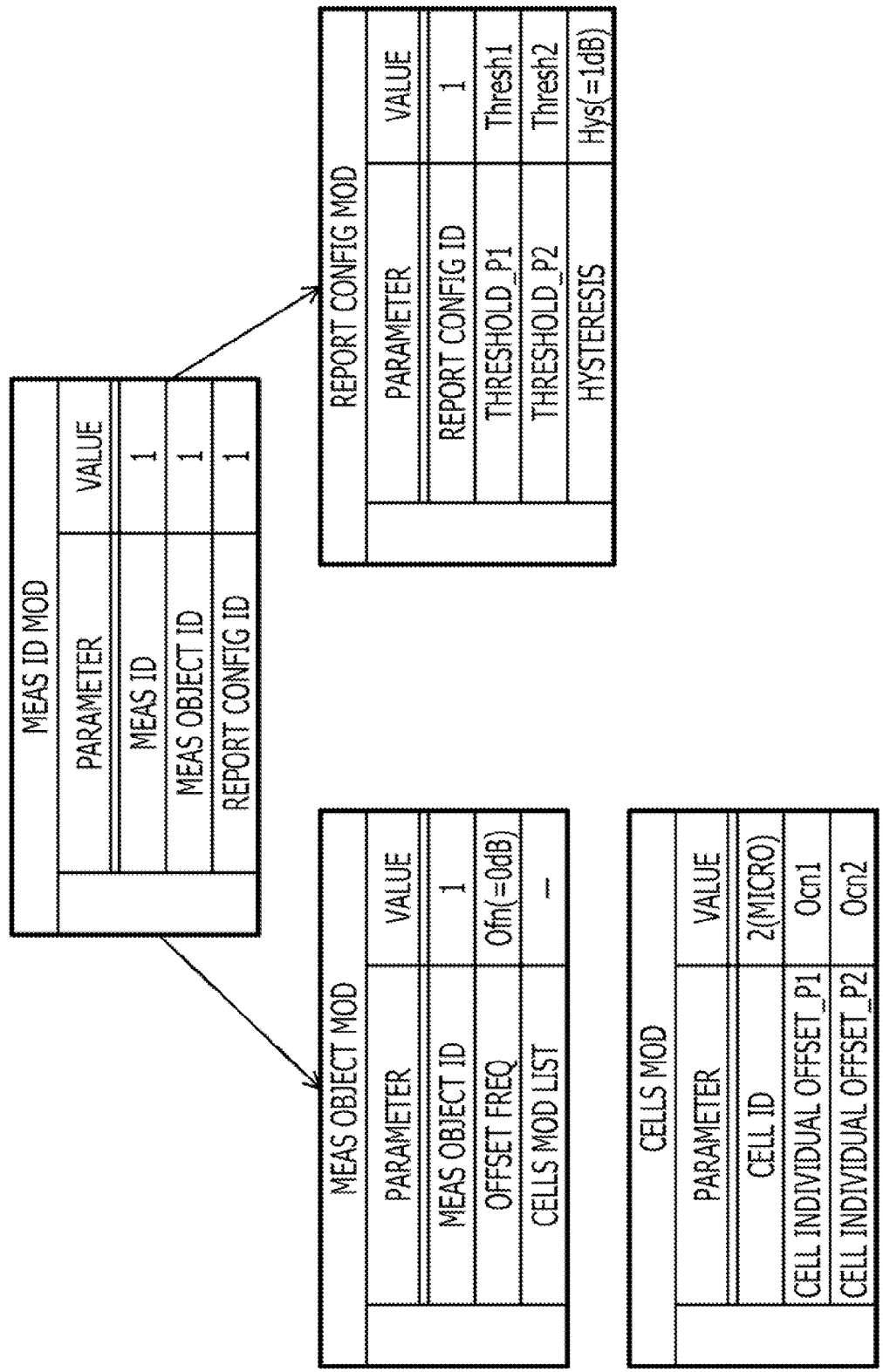
FIG. 7 illustrates a detailed example of measurement report configuration information sent from a macro base station to a mobile station that is connected to the macro base station in the wireless communication system of the first embodiment.

FIG. 7 is a detailed example of measurement report configuration information sent from the macro base station to a mobile station that is connected to the macro base station.

In FIG. 7, MeasObjectMod is a configuration of the frequency used by the micro base station cell. In MeasObjectMod, offsetFreq is set to Ofn (=0 dB), and the micro base station cell (here, CellID=2) is assigned to CellMod in CellModList. As an offset of the micro base station cell, cellIndividulaOffset_p1 is set to Ocn1, and cellIndividualOffset_p2 is set to Ocn2. In ReportConfigMod corresponding to MeasObjectMod, as the thresholds of the measurement report transmission conditions, threshold_p1 is set to Thresh1, and threshold_p2 is set to Thresh2. Hysteresis is set to Hys (here, 1 dB).

Figure 8:
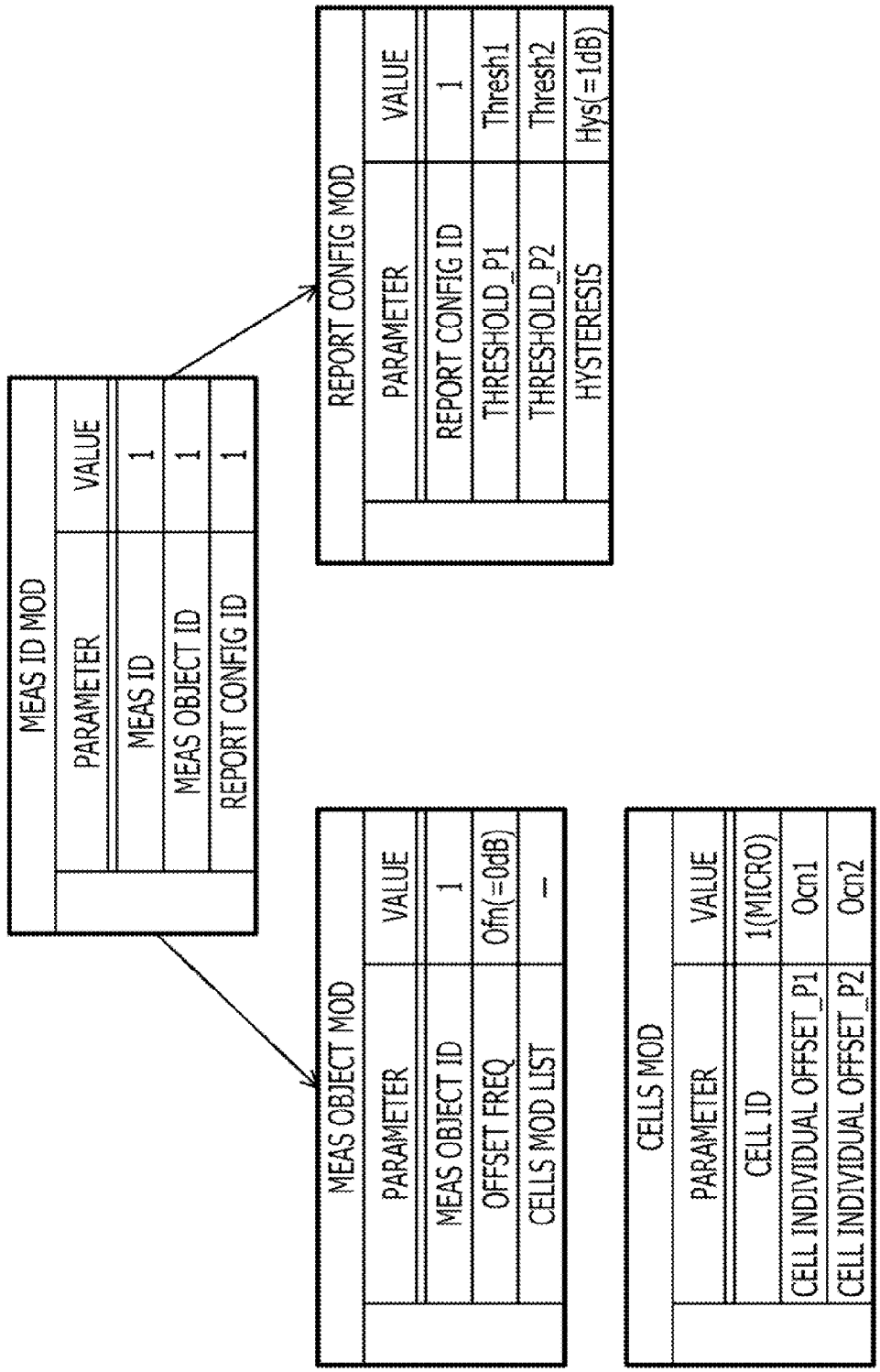
FIG. 8 illustrates a detailed example of measurement report configuration information sent from a micro base station to a mobile station that is connected to the micro base station in the wireless communication system of the first embodiment.

FIG. 8 illustrates a detailed example of measurement report configuration information sent from the micro base station to a mobile station that is connected to the micro base station.

In FIG. 8, MeasObjectMod is a configuration of the frequency used by the macro base station cell. In MeasObjectMod, offsetFreq is set to Ofn (=0 dB), and the macro base station cell (here, CellID=1) is assigned to CellMod in CellModList. As the offset of the macro base station cell, cellIndividulaOffset_p1 is set to Ocn1, and cellIndividualOffset_p2 is set to Ocn2. In ReportConfigMod of MeasObjectMod, as the thresholds of the measurement report transmission conditions, threshold_p1 is set to Thresh1, and threshold_p2 is set to Thresh2. Hysteresis is set to Hys (here, 1 dB).

As apparent from a comparison of FIGS. 7 and 8, the measurement report configuration information sets in FIGS. 7 and 8 contain the same parameter values, except for CellMod.

(A-3) Determining Measurement Report Transmission Conditions for Mobile Station

A method of determining the measurement report transmission conditions for a mobile station on the basis of parameters in the measurement report configuration information will be described below with reference to FIGS. 9 to 12.

(A-3-1) Mobile Station Connected to Macro Base Station Cell

Figure 9:
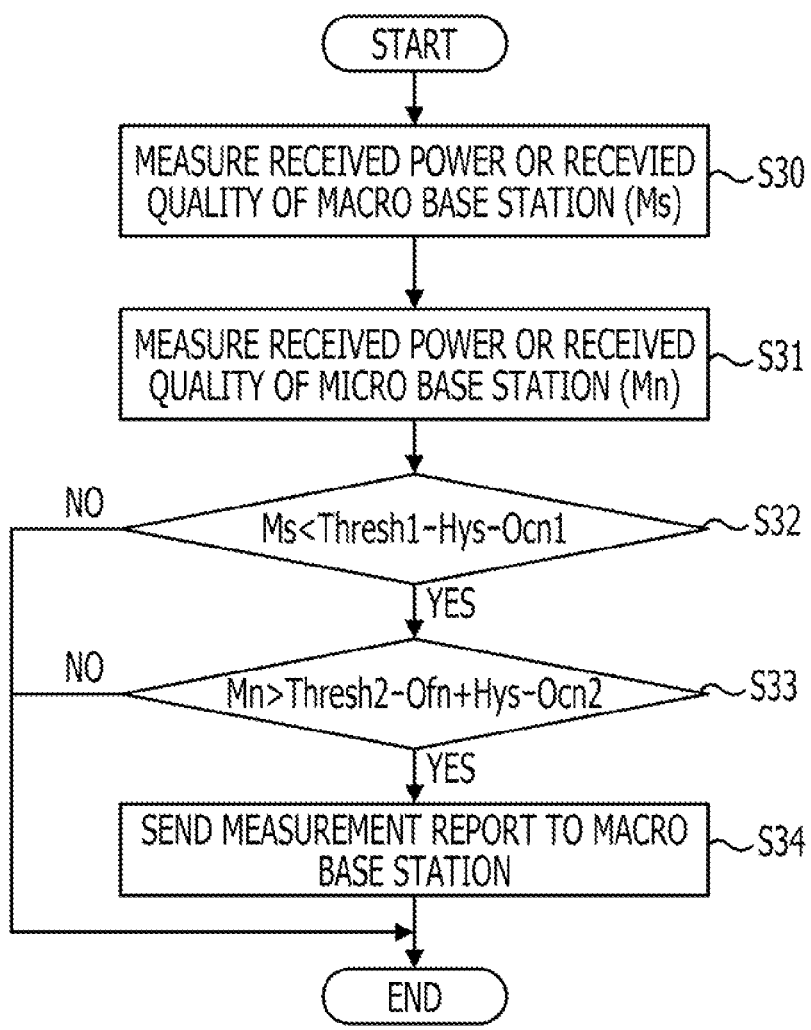
FIG. 9 is a flow chart illustrating the process carried out by a mobile station that is connected to a macro base station cell to determine measurement report transmission conditions in the first embodiment.

FIG. 9 is a flow chart illustrating the process carried out by a mobile station that is connected to the macro base station cell to refer to the measurement report configuration information illustrated in FIG. 7 and to determine the measurement report transmission conditions. In the first step in FIG. 9, the mobile station measures the received power or the received quality of the macro base station cell (Step S30). Similarly, the mobile station measures the received power or the received quality of the micro base station cell (Step S31). The mobile station determines whether the condition represented by Expression 1 is satisfied on the basis of the measured value Ms of the received power or received quality of the macro base station cell and the parameter values in the measurement report configuration information (Step S32). Thresh1−Hys−Ocn1 in Expression 1 is an example of a first threshold.

$$Ms < Thresh1 - Hys - Ocn1 \quad (1)$$

When Expression 1 is not satisfied, the mobile station ends the process. When Expression 1 is satisfied, the mobile station determines whether the condition represented by Expression 2 is satisfied on the basis of the measured value Mn of the received power or received quality of the micro base station cell and the parameter values in the measurement report configuration information (Step S33). Thresh2−Ofn+Hys−Ocn2 in Expression 2 is an example of a second threshold.

$$Mn > Thresh2 - Ofn + Hys - Ocn2 \quad (2)$$

When Expression 2 is not satisfied, the mobile station ends the process. When Expression 2 is satisfied, the mobile station sends a measurement report to the macro base station (Step S34) and then ends the process. That is, the mobile station that is connected to the macro base station cell sends a measurement report to the macro base station only when Expressions 1 and 2 are both satisfied.

(A-3-2) Mobile Station Connected Micro Base Station Cell

Figure 10:
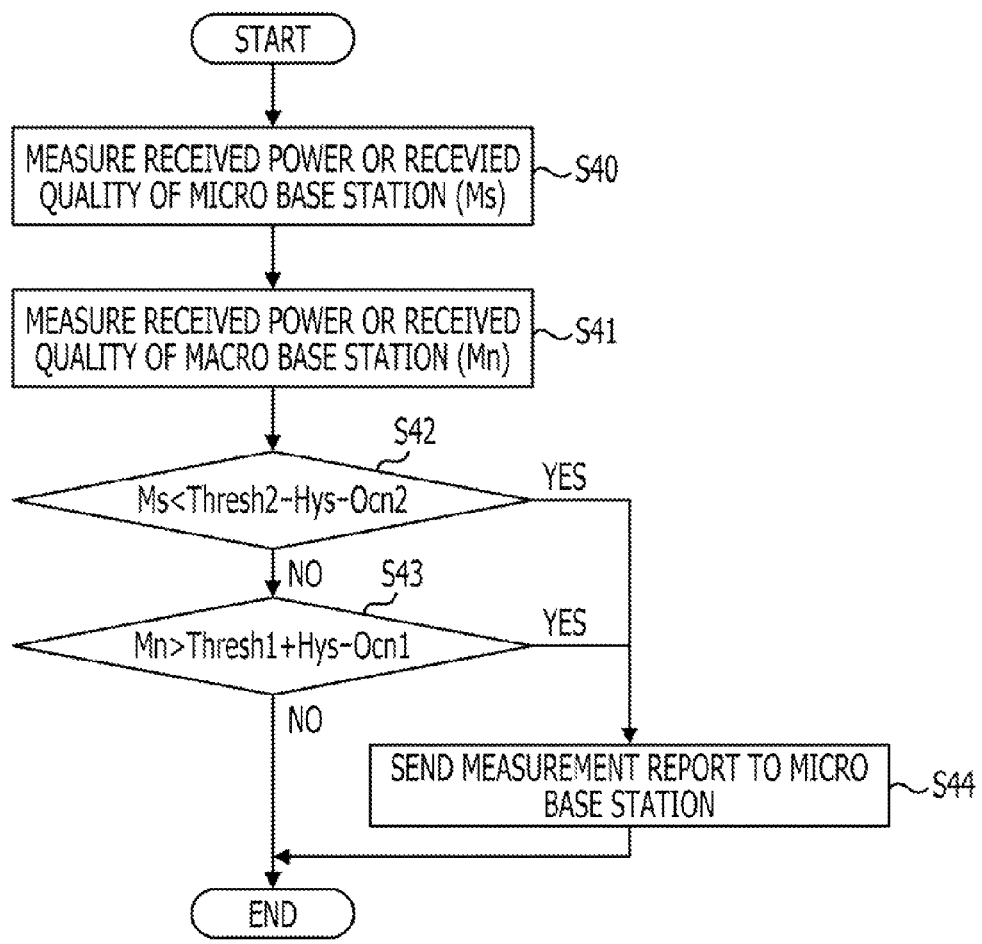
FIG. 10 is a flow chart illustrating the process carried out by a mobile station that is connected to a micro base station cell to determine measurement report transmission conditions in the first embodiment.

FIG. 10 is a flow chart illustrating the process carried out by a mobile station connected to the micro base station cell to refer to the measurement report configuration information illustrated in FIG. 8 and to determine the measurement report transmission conditions. In the first step in FIG. 10, the mobile station measures the received power or the received quality of the micro base station cell (Step S40). Similarly, the mobile station measures the received power or the received quality of the macro base station cell (Step S41). The mobile station determines whether the condition represented by Expression 3 is satisfied on the basis of the measured value Ms of the received power or received quality of the micro base station cell and the parameter values in the measurement report configuration information (Step S42). Thresh2−Hys−Ocn2 in Expression 3 is an example of a third threshold.

$$Ms < Thresh2 - Hys - Ocn2 \quad (3)$$

When Expression 3 is not satisfied, the mobile station determines whether the condition represented by Expression 4 is satisfied on the basis of the measured value Mn of the received power or received quality of the macro base station cell and the parameter values in the measurement report configuration information (Step S43). Thresh1-Ofn+Hys−Ocn1 in Expression 4 is an example of a fourth threshold.

$$Mn > Thresh1 - Ofn + Hys - Ocn1 \quad (4)$$

When Expression 4 is not satisfied, the mobile station ends the process. When Expression 3 or 4 is satisfied, the mobile station sends a measurement report to the micro base station (Step S44) and then ends the process. That is, the mobile station that is connected to the micro base station cell sends a measurement report to the micro base station when Expression 3 or 4 is satisfied.

Hys (Hysteresis) in Expressions 1 to 4 is set to prevent significantly frequent handover (known as ping-pong HO) from occurring between the macro base station cell and the micro base station cell.

Figure 11:
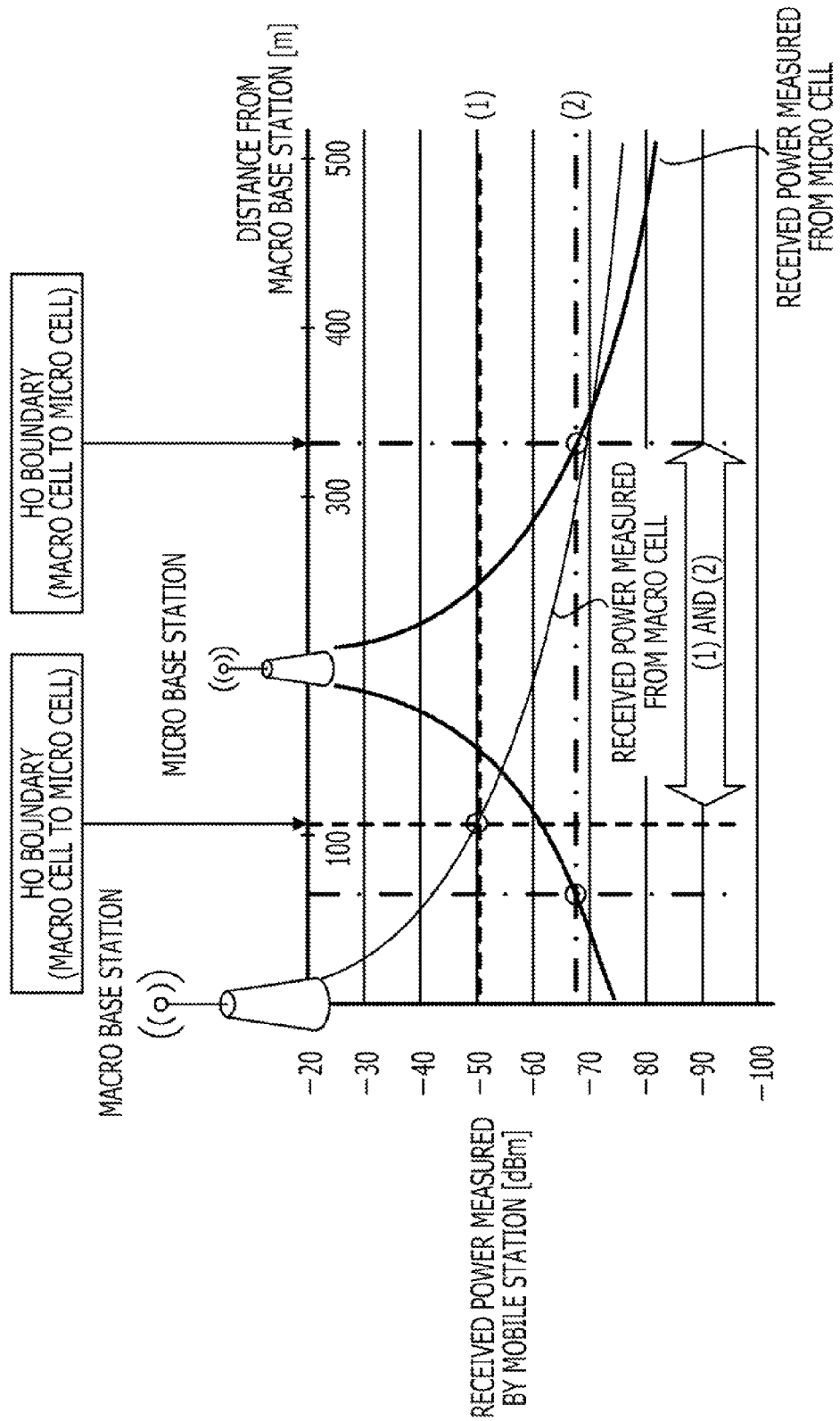
FIG. 11 illustrates handover boundaries of a mobile station handed over from a macro base station to a micro base station in the wireless communication system of the first embodiment.
Figure 12:
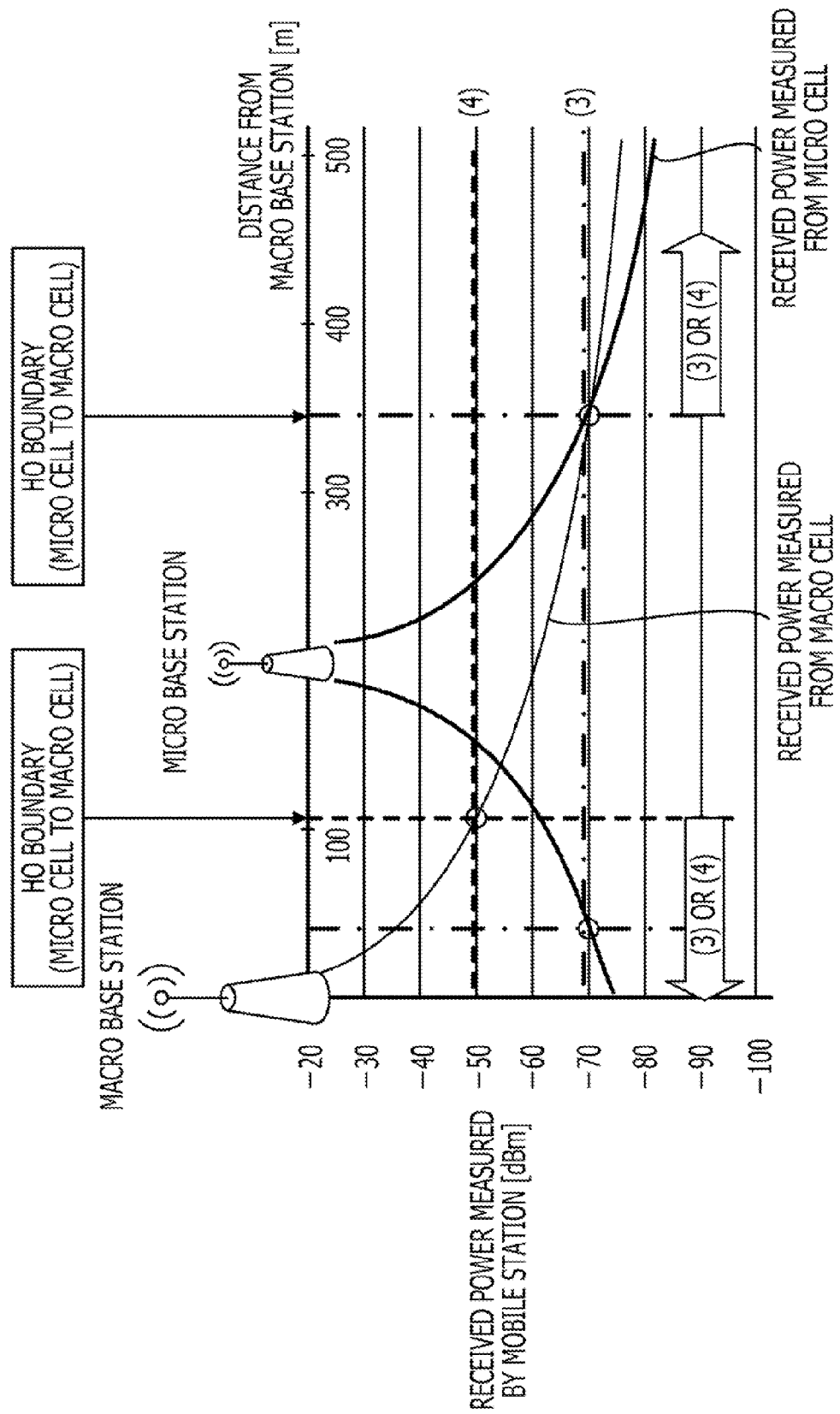
FIG. 12 illustrates handover boundaries of a mobile station handed over from a micro base station to a macro base station in the wireless communication system of the first embodiment.

As described above, the mobile station that is connected to the macro base station cell is handed over from the macro base station to the micro base station when Expressions 1 and 2 are both satisfied. The mobile station that is connected to the micro base station is handed over from the micro base station to the macro base station when Expression 3 or 4 is satisfied. FIGS. 11 and 12 respectively illustrate these handover conditions applied to the drawing in FIG. 2. FIG. 11 illustrates handover (HO) boundaries of the mobile station handed over from the macro base station to the micro base station. FIG. 12 illustrates handover (HO) boundaries of the mobile station handed over from the micro base station to the macro base station. FIG. 11 illustrates the lines representing the first threshold (Thresh1−Hys−Ocn1) in Expression 1 and the second threshold (Thresh2−Ofn+Hys−Ocn2) in Expression 2. FIG. 12 illustrates the lines representing the third threshold (Thresh2−Hys−Ocn2) in Expression 3 and the fourth threshold (Thresh1−Ofn+Hys−Ocn1) in Expression 4. With reference to FIGS. 11 and 12, it is apparent that, by updating Ocn1 and/or Ocn2, the HO boundaries can be moved to the left or right in FIGS. 11 and 12 in response to the load on the macro base station and the micro base station.

(A-4) Method of Updating Measurement Report Configuration Information

A method of updating the measurement report configuration information will be described below with reference to FIGS. 13 to 15.

Figure 13:
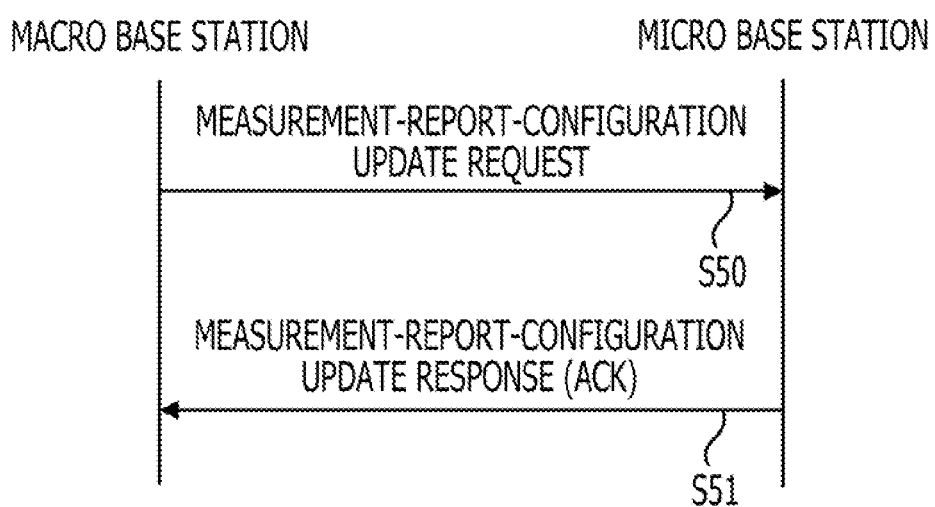
FIG. 13 illustrates an example sequence of updating measurement report transmission conditions for the macro base station and the micro base station in the wireless communication system of the first embodiment.

FIG. 13 illustrates an example sequence of updating the configuration of the measurement report transmission conditions between the macro mobile station and the micro base station. Here, it is presumed that a predetermined communication line, such as a x2 interface conforming to LTE, is established between the macro base station and the micro base station. With reference to FIG. 13, first, the macro base station sends a measurement-report-configuration update request message to the micro base station (Step S50). The micro base station that has received the measurement-report-configuration update request message confirms the load factor (cell load factor) of the micro base station cell; when the measurement report configuration can be updated, the micro base station sends a measurement-report-configuration update response message of ACK to the macro base station (Step S51). Then, the macro base station and the micro base station respectively update the measurement report configuration of the micro base station cell and the macro base station cell.

Figure 14:
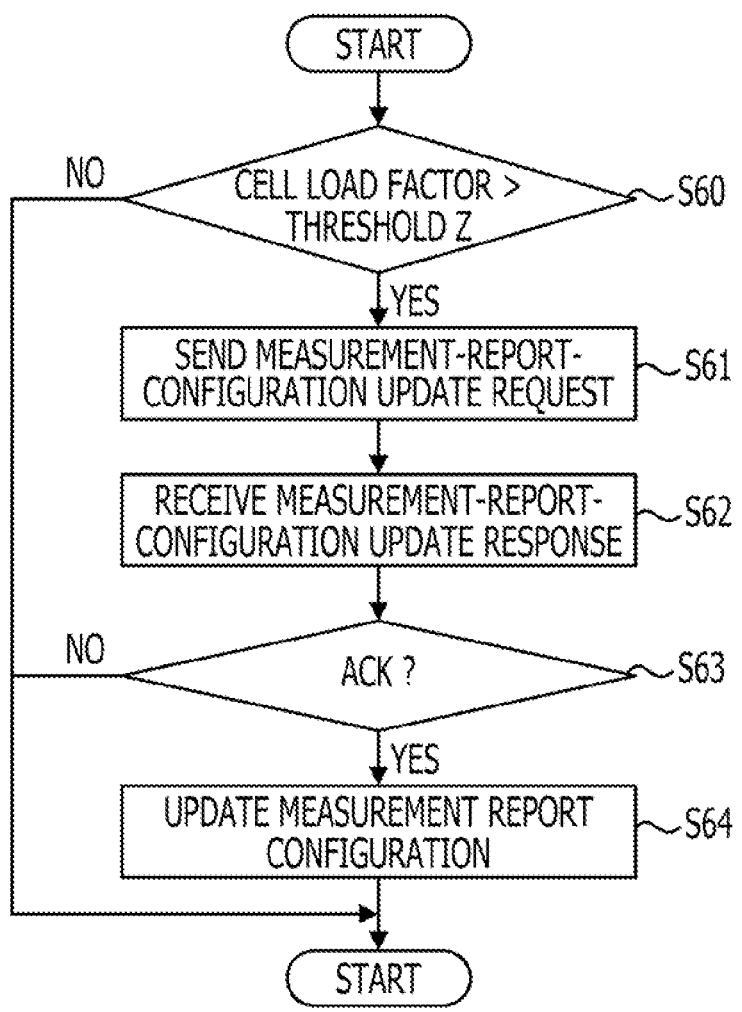
FIG. 14 illustrates the flow of updating the measurement report configuration of the macro base station of the first embodiment.

FIG. 14 illustrates the flow for updating the measurement report configuration of the macro base station. With reference to FIG. 14, first, the macro base station measures the cell load factor of the macro base station; when the load factor is larger than or equal to a threshold Z (system value) (YES in Step S60), the macro base station sends a measurement-report-configuration update request message to the micro base station (Step S61). Then, the macro base station receives a measurement-report-configuration update response message from the micro base station (Step S62); when the response is ACK (YES in Step S63), the measurement report configuration of the macro base station cell is updated (Step S64). When the response is not ACK (i.e., is NAK), the process is ended.

Figure 15:
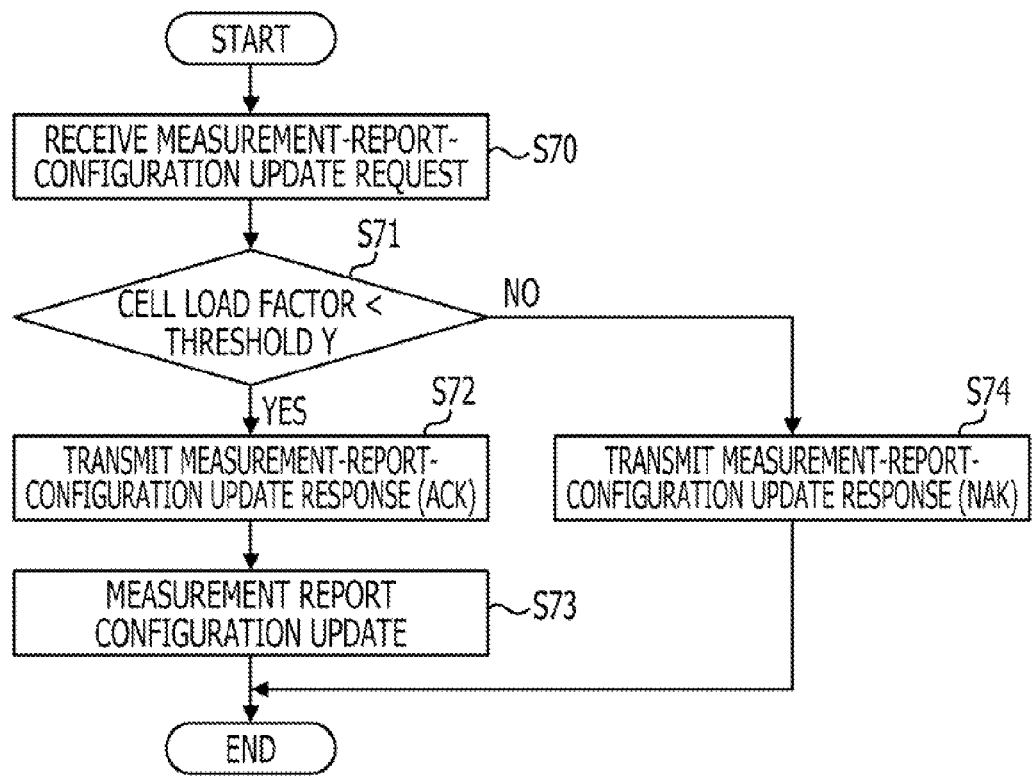
FIG. 15 illustrates the flow of updating the measurement report configuration of the micro base station of the first embodiment.

FIG. 15 illustrates the flow for updating the measurement report configuration of the micro base station. With reference to FIG. 15, first, the micro base station receives a measurement-report-configuration update request message from the macro base station (Step S70) and confirms the load on the micro base station cell. When the load on the micro base station cell is smaller than a predetermined threshold Y (system value) (YES in Step S71), a measurement-report-configuration update response message of ACK is sent to the macro base station (Step S72). Then, the micro base station updates the measurement report configuration of the micro base station cell (Step S73). When the load on the micro base station cell is larger than or equal to the threshold Y (NO in Step S71), a measurement-report-configuration update response message of NAK is sent to the macro base station (Step S74). Then, the process ends.

As illustrated in FIGS. 13 to 15, the update processes of the measurement report configurations are synchronized in the macro base station and the micro base station. In the measurement report configuration, Ocn1 and Ocn2 in the measurement report configuration information of the macro base station cell and Ocn1 and Ocn2 in the measurement report configuration information of the micro base station cell are updated.

(A-5) Details of Process Carried Out when Load on Macro Base Station is High With reference to FIGS. 16 to 18, the process of promoting handover of the mobile station from the macro base station to the micro base station in order to balance the load on the macro mobile station and the micro base station when the load on the macro base station is high will be described below.

Figure 16:
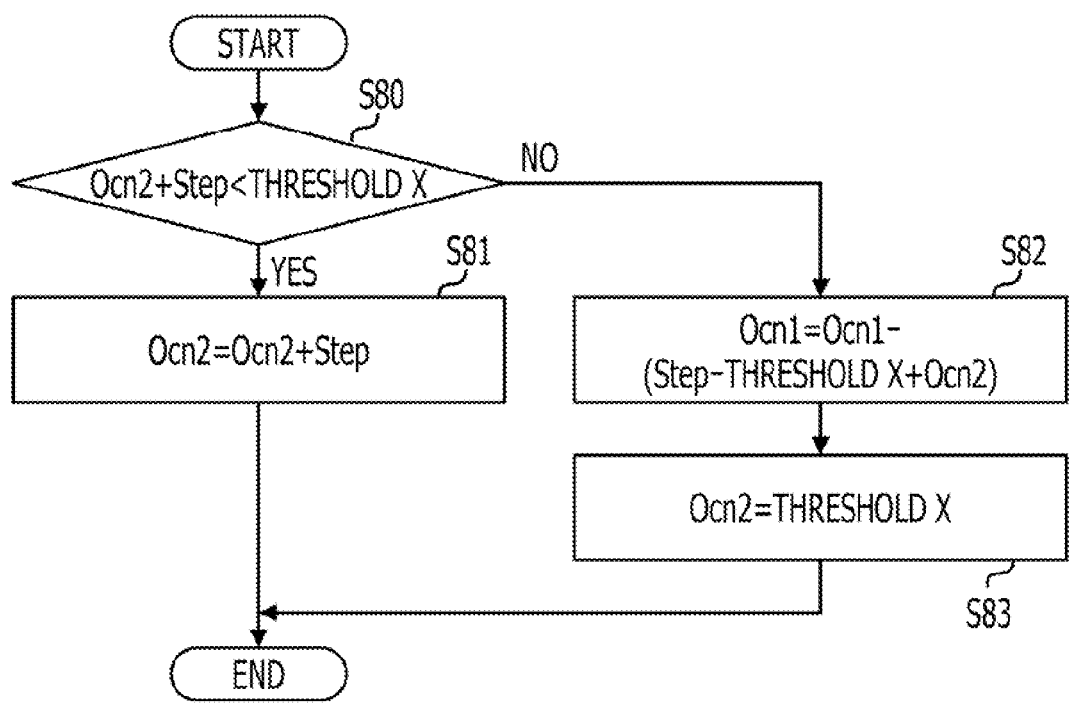
FIG. 16 is a flow chart illustrating an example process of updating parameters in the measurement report configuration of the macro base station cell and the micro base station cell in the wireless communication system of the first embodiment.

FIG. 16 is a flow chart illustrating an example process of updating Ocn1 and Ocn2 in the measurement report configuration of the macro base station cell and the micro base station cell. Ocn2 in the measurement report configuration is preferentially updated. That is, as illustrated in FIG. 17, Ocn2 is increased through the update, and handover of the mobile station is promoted such that the mobile station that is positioned near one of the two HO boundaries further from the macro base station is handed over to the micro base station cell. The radio propagation loss of the mobile station far away from the macro base station is large; therefore, to carry out adaptive modulation and coding (AMC), a modulation and coding scheme (MCS) having low throughput must be selected between the macro base station and the mobile station at a far position. Such a mobile station should be handed over to a micro base station as quickly as possible.

With reference to FIG. 16, if the Ocn2 value does not exceed the threshold X (system value) when increased by a step (YES in Step S80), the Ocn2 value is increased by a step (Step S81). If the Ocn2 value exceeds the threshold X in Step S80, i.e., if the upper limit is exceeded when a step is added to the Ocn2 value (NO in Step S80), Ocn1 is decreased by a step (Step S82), and Ocn2 is fixed at the threshold X (Step S83). Subsequently, Ocn1 is decreased one step at a time.

Figure 17:
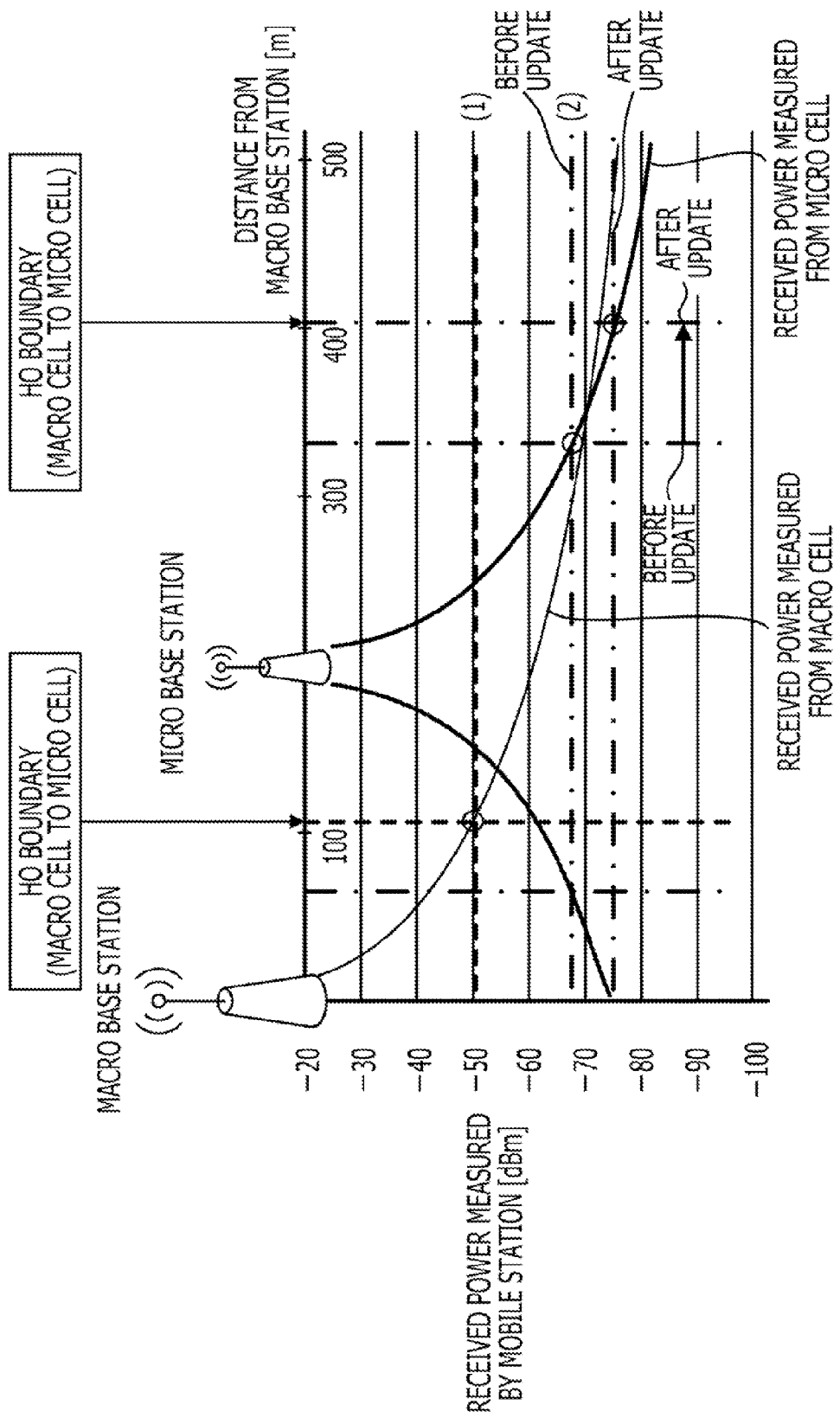
FIG. 17 illustrates the displacement of handover boundaries of a mobile station handed over from the macro base station cell to the micro base station cell when a parameter (Ocn2) value is increased through an update in the wireless communication system of the first embodiment.

FIG. 17 illustrates the displacement of the HO boundaries of the mobile station handed over from the macro base station to the micro base station when the Ocn2 value is increased through an update. Ocn2 is a parameter in Expression 2; a large Ocn2 value decreases the value of the right term of Expression 2. In this way, the second threshold of the received power or received quality of a reference signal from the micro base station cell becomes small for the mobile station that is connected to the macro base station cell. In other words, line (2) in FIG. 17 is lowered. Through such an update, the HO boundary on the right side of the micro base station moves toward the right in FIG. 17. Thus, by increasing Ocn2 through the update, transmission of a measurement report from the mobile station that is connected to the macro base station cell positioned between the original HO boundary and the displaced HO boundary is expected. The macro base station, which has received the measurement report from the mobile station, can start the process of handing over the mobile station to the micro base station.

When the Ocn2 value is increased through the update, the HO boundary on the left side of the micro base station does not move.

Figure 18:
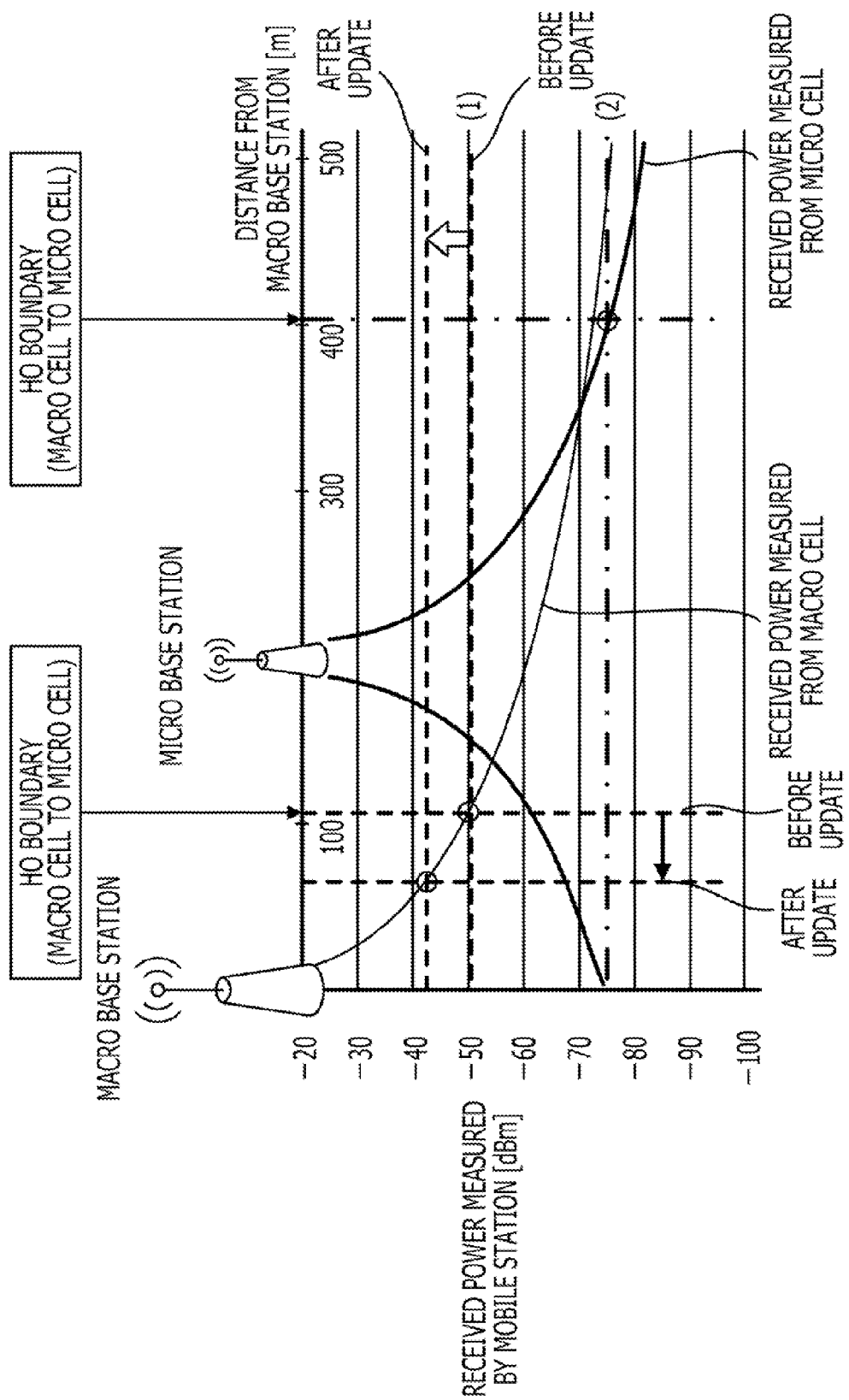
FIG. 18 illustrates the displacement of handover boundaries of a mobile station handed over from the macro base station cell to the micro base station cell when a parameter (Ocn1) value is decreased through an update in the wireless communication system of the first embodiment.

FIG. 18 illustrates the displacement of the HO boundaries of the mobile station handed over from the macro base station to the micro base station when the Ocn1 value is decreased through an update. Ocn1 is a parameter in Expression 1; a small Ocn1 value increases the value of the right term of Expression 1. In this way, the first threshold of the received power or received quality of a reference signal from the macro base station cell becomes large for the mobile station that is connected to the macro base station cell. In other words, line (1) in FIG. 18 is raised. Through such an update, the HO boundary on the left side of the micro base station moves toward the left in FIG. 18. Thus, by decreasing Ocn1, transmission of a measurement report from the mobile station positioned near the macro base station is expected. The macro base station, which has received the measurement report from the mobile station, can start the process of handing over the mobile station to the micro base station cell.

When the Ocn1 value is decreased through the update, the HO boundary on the right side of the micro base station does not move.

FIGS. 17 and 18 illustrate the displacement of the HO boundaries of the mobile station being handed over from the macro base station cell to the micro base station cell; the displacement of HO boundaries of the mobile station handed over from the micro base station cell to the macro base station cell is the same as that illustrated in FIGS. 17 and 18.

As described above, in the wireless communication system of this embodiment, by increasing Ocn2 through preferential update when the load on the macro base station cell is high, the HO boundary on the right side of the micro base station (further from the macro base station) is displaced. In this way, it is possible to start the process of preferentially handing over the mobile station that is connected to the macro base station cell near the HO boundary to the micro base station cell. Since the electric power or the reception quality of the reference signal received by the mobile station, which has been handed over from the macro base station cell to the micro base station cell, is substantially the same before and after the handover, load transition with excellent frequency use efficiency can be carried out.

When Ocn2 reaches the upper limit, the HO boundary in the area between the macro base station and the micro base station (i.e., HO boundary closer to the macro base station) is displaced by decreasing Ocn1 through the update. As a result of this displacement, the process of handing over the mobile station that is connected to the macro base station cell near the macro base station to the micro base station cell can be started. In this way, when the load on the macro base station cell is extremely high, it is possible to reduce the load on the macro base station cell by maximizing the frequency use of the micro base station cell.

(A-6) Process Carried Out when Load on Micro Base Station is High

The process of promoting handover of the mobile station from the micro base station to the macro base station in order to balance the load on the macro mobile station and the micro base station when the load on the micro base station is high will be described below.

Figure 19:
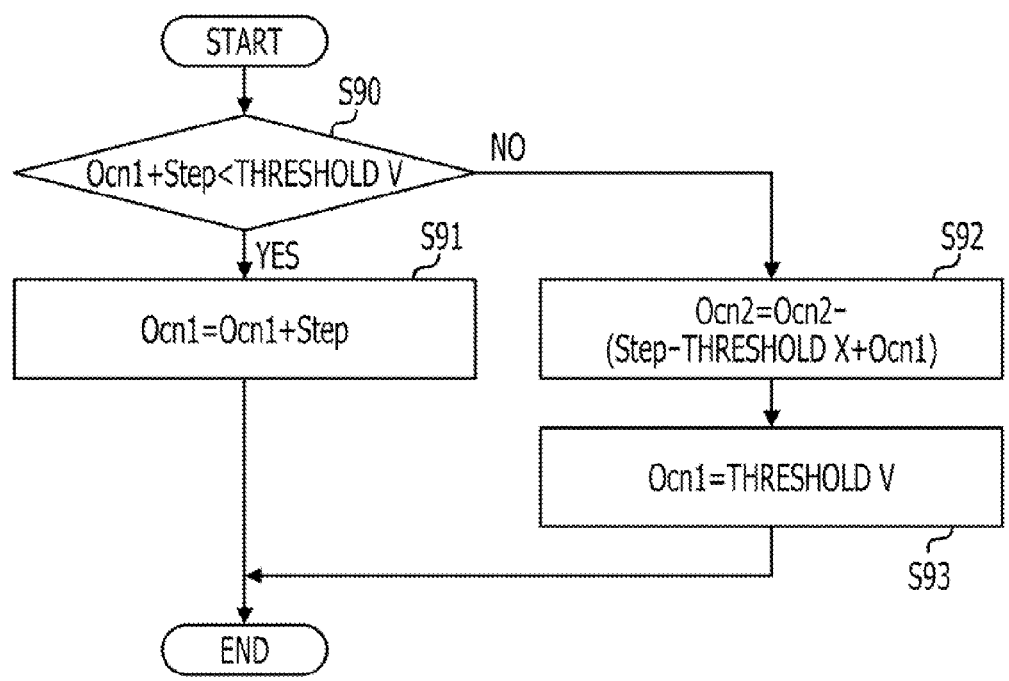
FIG. 19 is a flow chart illustrating an example process of updating parameters in the measurement report configuration of the macro base station cell and the micro base station cell of the first embodiment.
Figure 20:
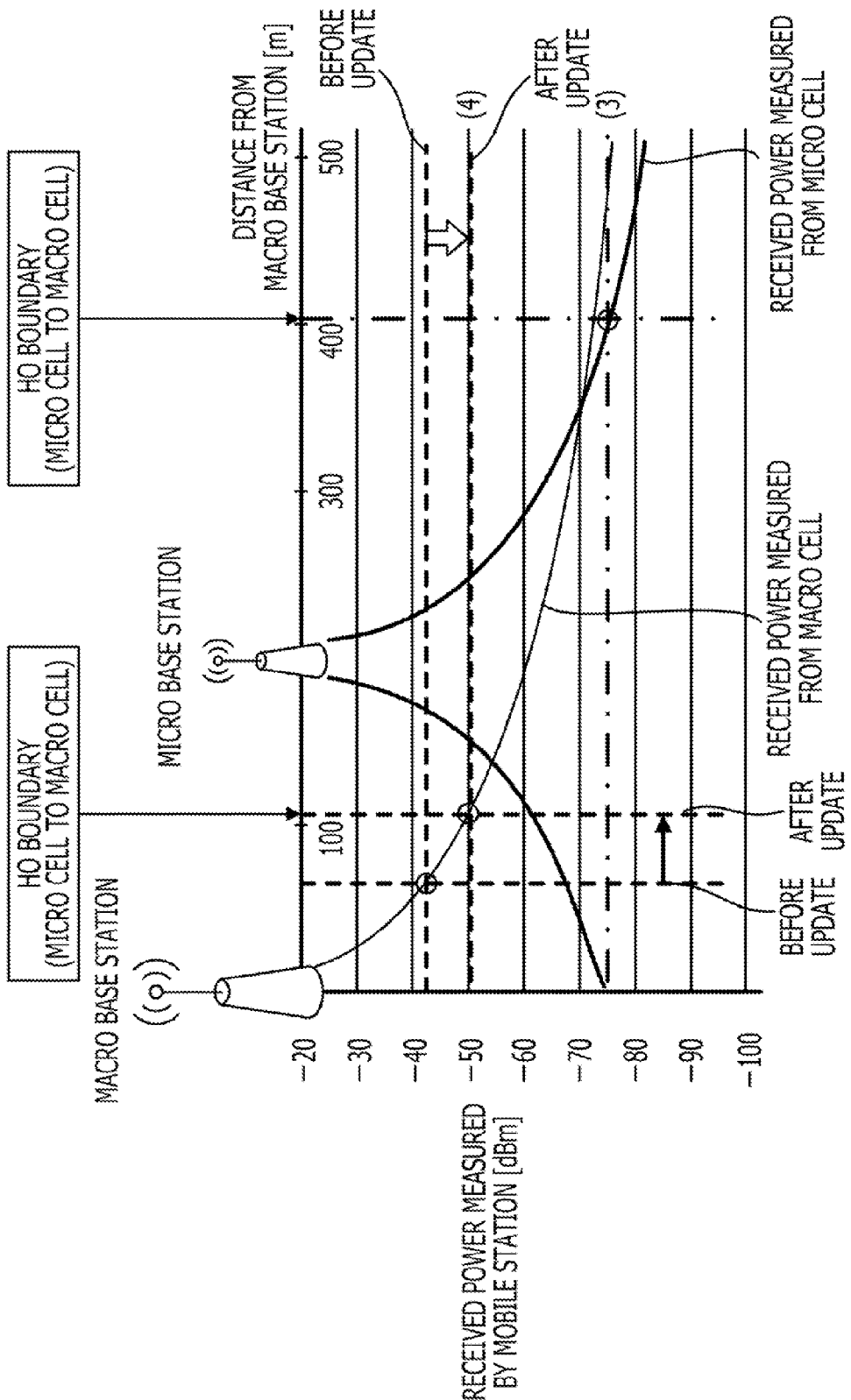
FIG. 20 illustrates the displacement of handover boundaries of a mobile station handed over from the micro base station cell to the macro base station cell when a parameter (Ocn1) value is increased through an update in the wireless communication system of the first embodiment.

FIG. 19 is a flow chart illustrating an example process of updating Ocn1 and Ocn2 in the measurement report configuration of the macro base station cell and the micro base station cell. Ocn1 in the measurement report configuration is preferentially updated. That is, as illustrated in FIG. 20, Ocn1 is increased through the update, and handover of the mobile station is promoted such that the mobile station connected to the macro base station cell and positioned near one of the two HO boundaries closer to the macro base station is handed over to the micro base station cell. Since the received power or the received quality is satisfactory after the mobile station that is positioned close to the macro base station is handed over to the macro base station cell, MCS having high throughput can be selected for the macro base station, which is the handover destination. Hence, the overall frequency use efficiency is satisfactory.

With reference to FIG. 19, if the Ocn1 value does not exceed the threshold V (system value) when increased by a step (YES in Step S90), the Ocn1 value is increased by a step (Step S91). If the Ocn1 value exceeds the threshold V in Step S90, i.e., if the upper limit is exceeded when a step is added to the Ocn1 value (NO in Step S90), Ocn2 is decreased by a step (Step S92), and Ocn1 is fixed at the threshold V (Step S93). Subsequently, Ocn2 is decreased one step at a time.

FIG. 20 illustrates the displacement of the HO boundaries of the mobile station handed over from the micro base station to the macro base station when the Ocn1 value is increased through an update. Ocn1 is a parameter in Expression 4; a large Ocn1 value decreases the value of the right term of Expression 4. In this way, the fourth threshold of the received power or received quality of a reference signal from the macro base station cell becomes small for the mobile station that is connected to the micro base station cell. In other words, line (4) in FIG. 20 is lowered. Through such an update, the HO boundary on the left side of the micro base station moves toward the right in FIG. 20. Thus, by increasing Ocn1 through the update, transmission of a measurement report from the mobile station that is connected to the micro base station cell positioned between the original HO boundary and the displaced HO boundary is expected. The micro base station, which has received the measurement report from the mobile station, can start the process of handing over the mobile station to the micro base station cell.

When the Ocn1 value is increased through the update, the HO boundary on the right side of the micro base station does not move.

Figure 21:
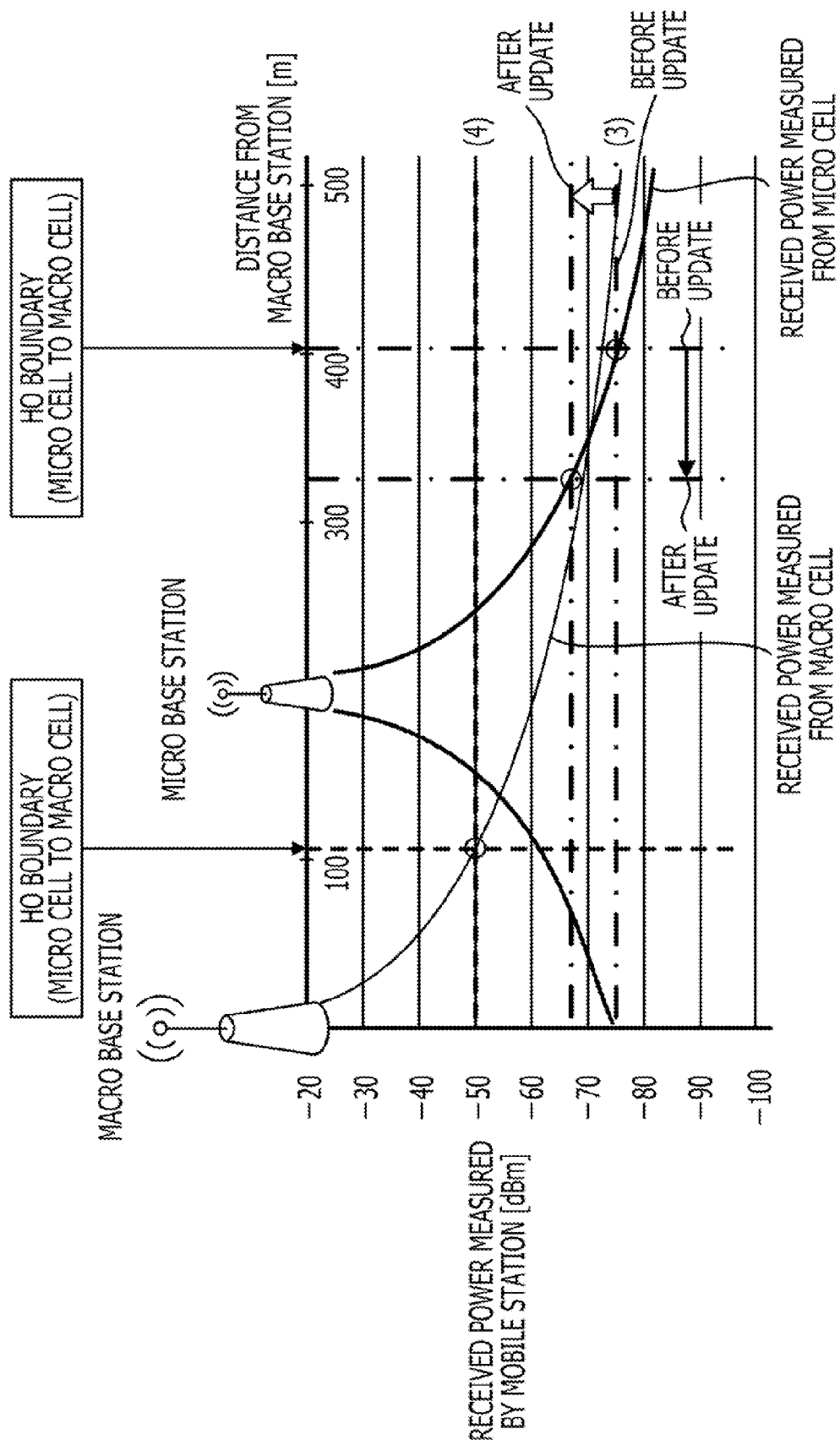
FIG. 21 illustrates the displacement in handover boundaries of a mobile station handed over from the micro base station cell to the macro base station cell when a parameter (Ocn2) value is decreased through an update in the wireless communication system of the first embodiment.

FIG. 21 illustrates the displacement of the HO boundaries of the mobile station handed over from the micro base station to the macro base station when the Ocn2 value is decreased through an update. Ocn2 is a parameter in Expression 3; a small Ocn2 value increases the value of the right term of Expression 3. In other words, line (3) in FIG. 21 is raised. Through such an update, the HO boundary on the right side of the macro base station moves toward the left in FIG. 21. Thus, by decreasing Ocn2, transmission of a measurement report from a mobile station on the right side of the macro base station is also expected. The micro base station, which has received the measurement report from such a mobile station, can start the process of handing over the mobile station to the macro base station cell.

When the Ocn2 value is decreased through the update, the HO boundary on the left side of the micro base station does not move.

FIGS. 20 and 21 illustrate the displacement of the HO boundaries of the mobile station handed over from the micro base station cell to the macro base station cell; the displacement of HO boundaries of the mobile station handed over from the macro base station cell to the micro base station cell is the same as that illustrated in FIGS. 20 and 21.

As described above, in the wireless communication system of this embodiment, by increasing Ocn1 through preferential update when the load on the micro base station cell is high, the HO boundary on the left side of the micro base station (closer to the macro base station) is displaced. In this way, it is possible to start the process of preferentially handing over the mobile station that is connected to the micro base station cell near the HO boundary to the macro base station cell. Since, near the macro base station, the electric power or the reception quality of the reference signal received by the mobile station, which has been handed over from the micro base station cell to the macro base station cell, is high, the received power or the received quality is improved after the handover; thus, the overall frequency use efficiency is improved.

When Ocn1 reaches the upper limit, the HO boundary on the right side of the micro base station is displaced by decreasing Ocn2 through an update. As a result of this displacement, the process of handing over a mobile station that is positioned far away from the macro base station and connected to the micro base station cell to the macro base station cell can be started.

(A-7) Configuration of Base Station and Mobile Station

Figure 22:
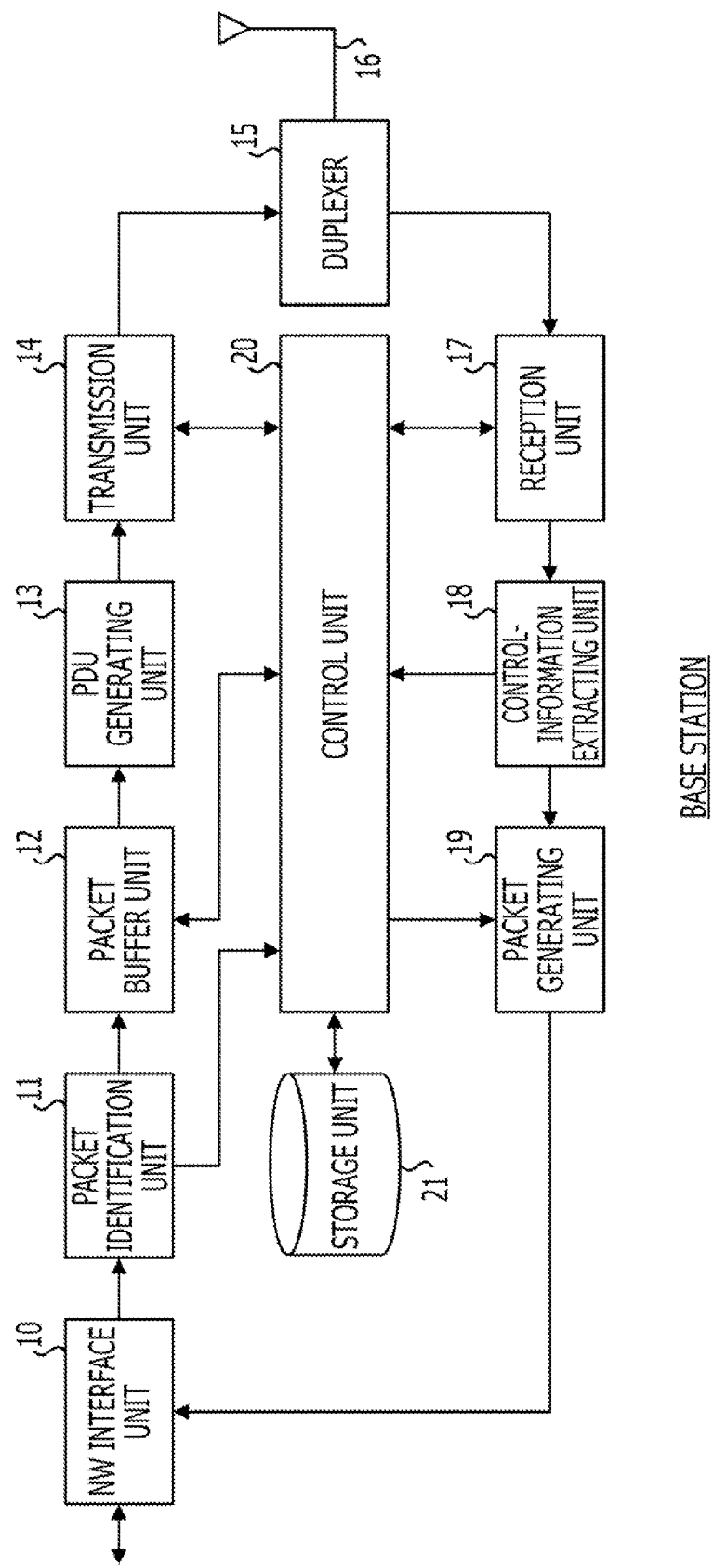
FIG. 22 is a block diagram illustrating example components of a base station of the first embodiment.
Figure 23:
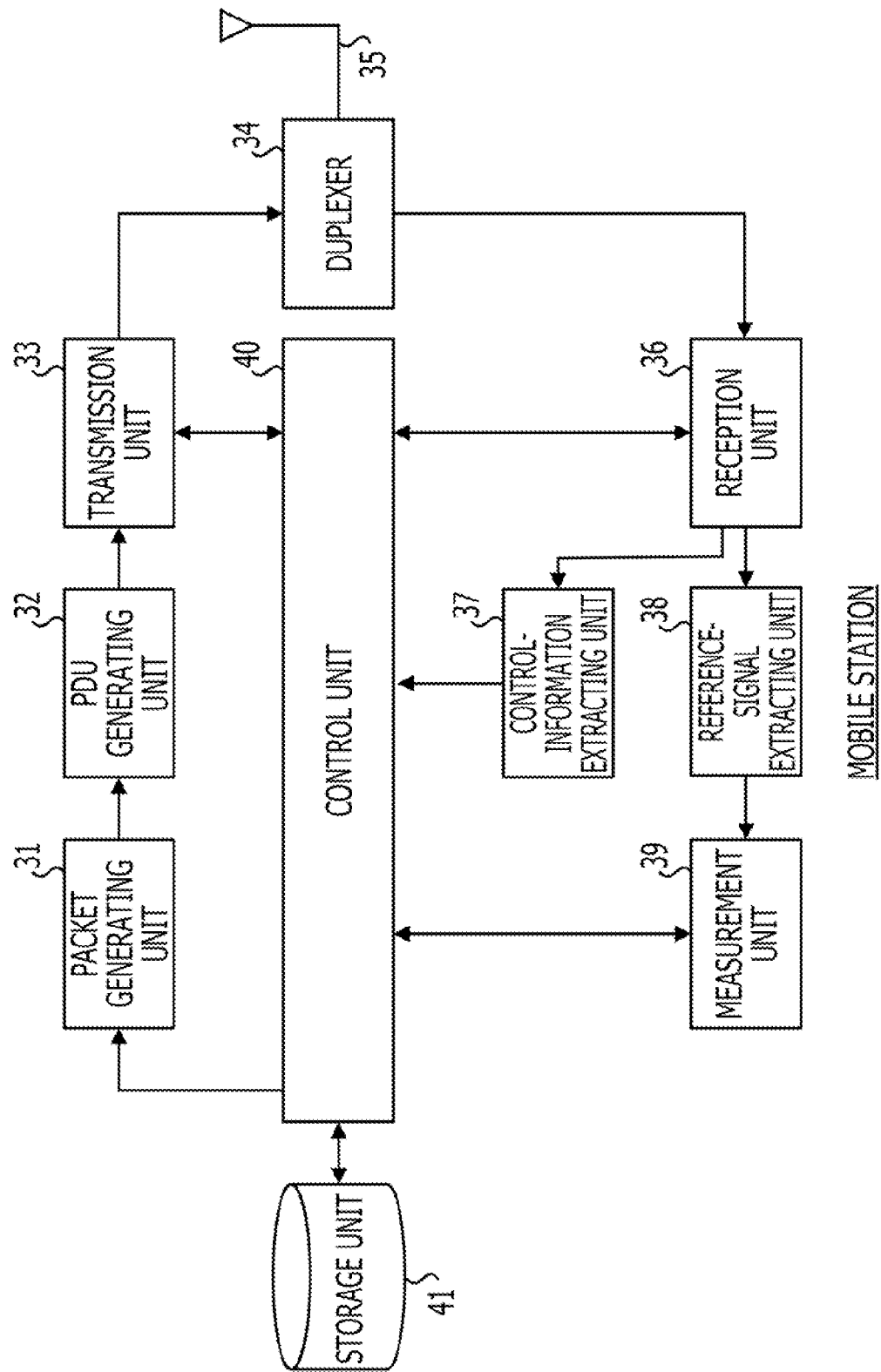
FIG. 23 is a block diagram illustrating example components of a mobile station of the first embodiment.

The configuration of a base station and a mobile station according to this embodiment will be described below with reference to FIGS. 22 and 23. FIG. 22 is a block diagram illustrating the components of a base station (macro base station or micro base stations) according to this embodiment. FIG. 23 is a block diagram illustrating the components of a mobile station according to this embodiment.

With reference to FIG. 22, a base station according to this embodiment includes a network (NW) interface unit 10, a packet identification unit 11, a packet buffer unit 12, a PDU generating unit 13, a transmission unit 14 (e.g., transmitter), a duplexer 15, an antenna 16, a reception unit 17 (e.g., receiver), a control-information extracting unit 18, a packet generating unit 19, a control unit 20 (e.g., controller), and a storage unit 21 (e.g., memory). The duplexer 15 is provided so as to use the antenna 16 for both transmission and reception, for example.

As illustrated in FIG. 22, the NW interface unit 10 carries out communication with a higher-level device and other base stations via a network, receives packets from the network, and transmits packets to the network. The packet identification unit 11 identifies packets from the network addressed to a mobile station that is assigned to the base station and stores the packets in an assigned packet buffer, among packet buffers assigned for all mobile stations in the packet buffer unit 12. The packet identification unit 11 also transmits messages (packets) from adjoining base stations to the control unit 20.

The PDU generating unit 13 combines or decomposes packets to convert the packets into protocol data units (PDUs) for wireless transmission. The transmission unit 14 codes and modulates the PDUs and transmits the coded and modulated PDUs to the mobile station via the antenna 16.

The reception unit 17 decodes and demodulates the PDUs from the mobile station. The control-information extracting unit 18 transmits the PDUs from the mobile station to the control unit 20 when the PDUs are control information, such as measurement reports, for example. The control-information extracting unit 18 transmits the PDUs to the packet generating unit 19 when the PDUs from the mobile station are for the network. The packet generating unit 19 converts the PDUs from the mobile station to packets and transmits the packets to the NW interface unit 10.

The control unit 20 controls the transmission unit 14 and the reception unit 17 and performs scheduling for the wireless sections. The control unit 20 also calculates the load factor ("cell load factor" in Step S60 in FIG. 14) of the wireless resources from the transmission unit 14 and the reception unit 17. The load factor is an index representing the throughput with respect to the upper limit of the processing capacity of the base station. The throughput calculation method is not limited and, for example, a method of measuring the number of resource blocks or packets (PDUs) processed at the control unit 20 per unit time, a method of measuring averaged samples in a predetermined amount of time, or a method of measuring throughput may be employed.

When the load on the base station is adjusted (for example, reduced) on the basis of the calculated load factor of the base station and a predetermined criterion (threshold) the control unit 20 generates a measurement-report-configuration update request addressed to an adjoining base station. The measurement-report-configuration update request is sent to the packet generating unit 19. The control unit 20 receives a measurement-report-configuration update response from the adjoining base station via the packet identification unit 11. When the measurement report configuration is changed, the control unit 20 sends an RRC connection reconfiguration containing a new measurement report configuration to the packet buffer unit 12.

When the control unit 20 receives a measurement-report-configuration update request from the adjoining base station via the packet identification unit 11, the control unit 20 calculates the load factor of the base station, generates a measurement-report-configuration update response on the basis of the calculated result, and sends this response to the packet generating unit 19.

The storage unit 21 holds the calculated load factors, the measurement report parameters, etc.

As illustrated in FIG. 23, the mobile station of this embodiment includes a packet generating unit 31, a PDU generating unit 32, a transmission unit 33 (e.g., transmitter), a duplexer 34, an antenna 35, a reception unit 36 (e.g., receiver), a control-information extracting unit 37, a reference-signal extracting unit 38, a measurement unit 39, a control unit 40 (e.g., controller), and a storage unit 41 (e.g., memory). With the configuration of the mobile station illustrated in FIG. 23, the packet generating unit 31, the PDU generating unit 32, the transmission unit 33, the duplexer 34, the antenna 35, and the reception unit 36 are functionally the same as those of the base station described above; thus, descriptions thereof are not repeated below.

The reference-signal extracting unit 38, which is illustrated in FIG. 23, extracts a known reference signal from signals sent from the base station. The measurement unit 39 measures the received power or the received quality of the extracted reference signal.

The control unit 40 obtains an RRC connection reconfiguration message containing measurement report configuration information from the base station via the reception unit 36 and stores the measurement report configuration information in the storage unit 41. The control unit 40 determines whether the received power or the received quality measured by the measurement unit 39 satisfies predetermined conditional expressions (i.e., Expressions 1 to 4 described above) on the basis of parameter values in the obtained measurement report configuration information. As a result, the control unit 40 controls the packet generating unit 31 to transmit a measurement report message to the base station when the above-described measurement report transmission conditions are satisfied.

(B) Second Embodiment

A second embodiment will be described below.

(B-1) Measurement Report Configuration Information

In this embodiment, the outline of a method of distributing load (the flows in FIGS. 3 and 4) is the same as that according to the first embodiment, except that the measurement report configuration information differs from that in the first embodiment. The measurement report configuration information in the second embodiment will be described in the following with reference to FIGS. 24 to 28. In this embodiment, unlike that in the first embodiment, two sets of measurement report configuration information are sent to a mobile station.

FIG. 24 illustrates an example format of the measurement report configuration information in this embodiment. As illustrated in FIG. 24, event in ReportConfigMod is a parameter setting the type of measurement report transmission condition in which "A" or "B" is assigned. When A is assigned to event, threshold, which is the threshold of the measurement report, is used. When B is assigned to event, offset, which is the offset of the measurement report, is used. cellIndividualOffset in CellMod is the offset of a cell. Other parameters are the same as those illustrated in FIG. 5.

In this embodiment, two configuration information sets are sent from a base station to a mobile station; one being a set of the measurement report configuration information in which A is assigned to event and the other being a set of the measurement report configuration information in which B is assigned to event.

Figure 25:
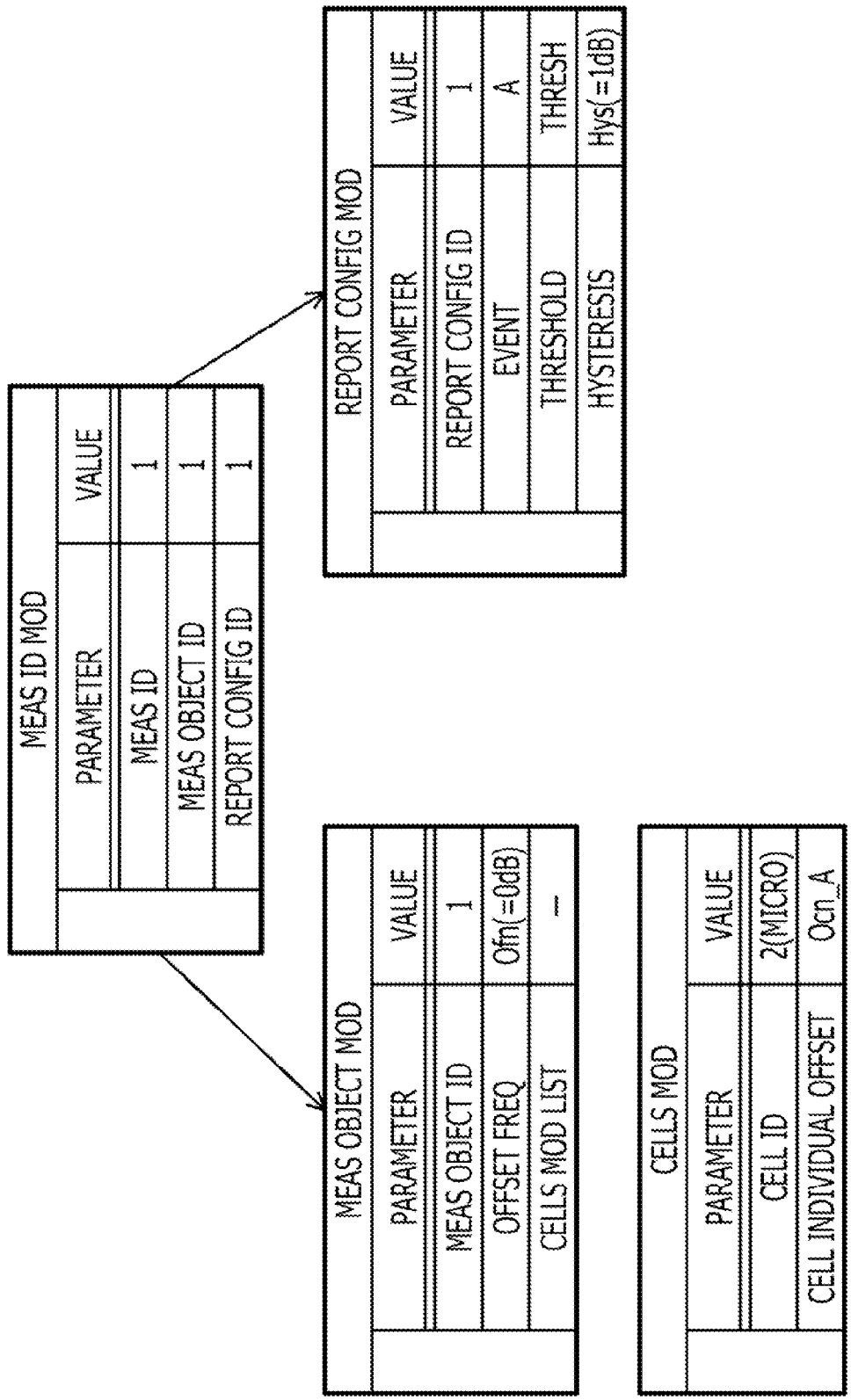
FIG. 25 illustrates examples of two sets of measurement report configuration information sent from a macro base station of the second embodiment to a mobile station that is connected to the macro base station.
Figure 26:
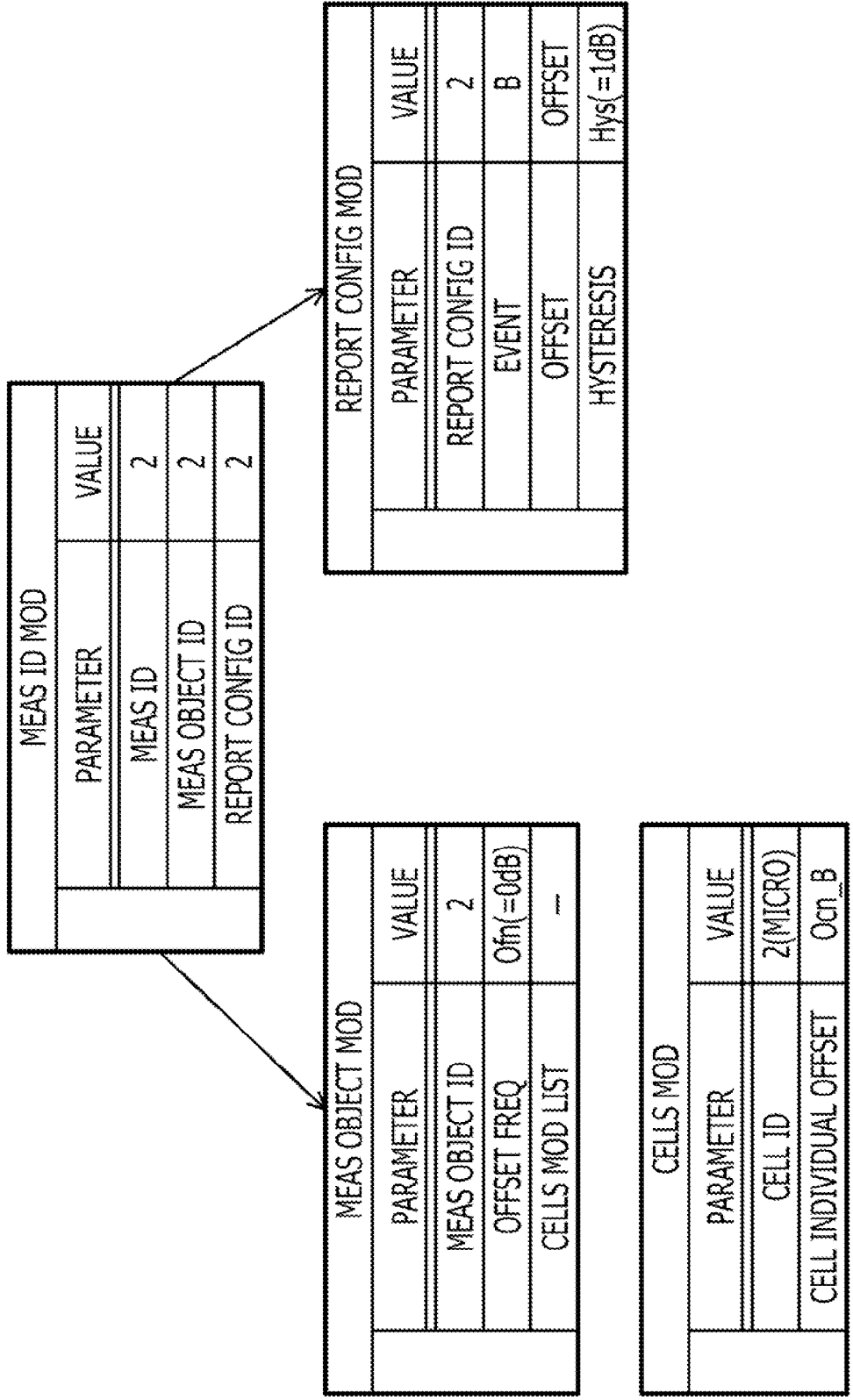
FIG. 26 illustrates examples of two sets of measurement report configuration information sent from the macro base station of the second embodiment to a mobile station that is connected to the macro base station.

FIGS. 25 and 26 illustrate two sets of example measurement report configuration information to be sent from the macro station to a mobile station that is connected to the macro base station.

The measurement report configuration information in FIG. 25 contains measID=1, measObjectID=1, and reportConfigID=1. The measurement report configuration information in FIG. 26 contains measID=2, measObjectID=2, and reportConfigID=2. In other words, ReportConfigMod containing reportConfigID=1 is applied to MeasObjectMod containing measObjectID=1. Similarly, ReportConfigMod containing reportConfigID=2 is applied to MeasObjectMod containing measObjectID=2.

With the measurement report configuration information in FIG. 25, A is assigned for event in ReportConfigMod. With the measurement report configuration information in FIG. 26, B is assigned for event in ReportConfigMod. As represented by CellMod in CellModList, in either case, a micro base station cell is assigned (CellID=2).

Since A is assigned for event in ReportConfigMod in the measurement report configuration information in FIG. 25, thresh is assigned to Thresh (threshold). Ocn_A is assigned to cellIndividualOffset in CellMod.

Since B is assigned for event in ReportConfigMod in the measurement report configuration information in FIG. 26, offset is assigned to Offset (offset threshold). Ocn_B is assigned to cellIndividualOffset in CellMod.

Figure 27:
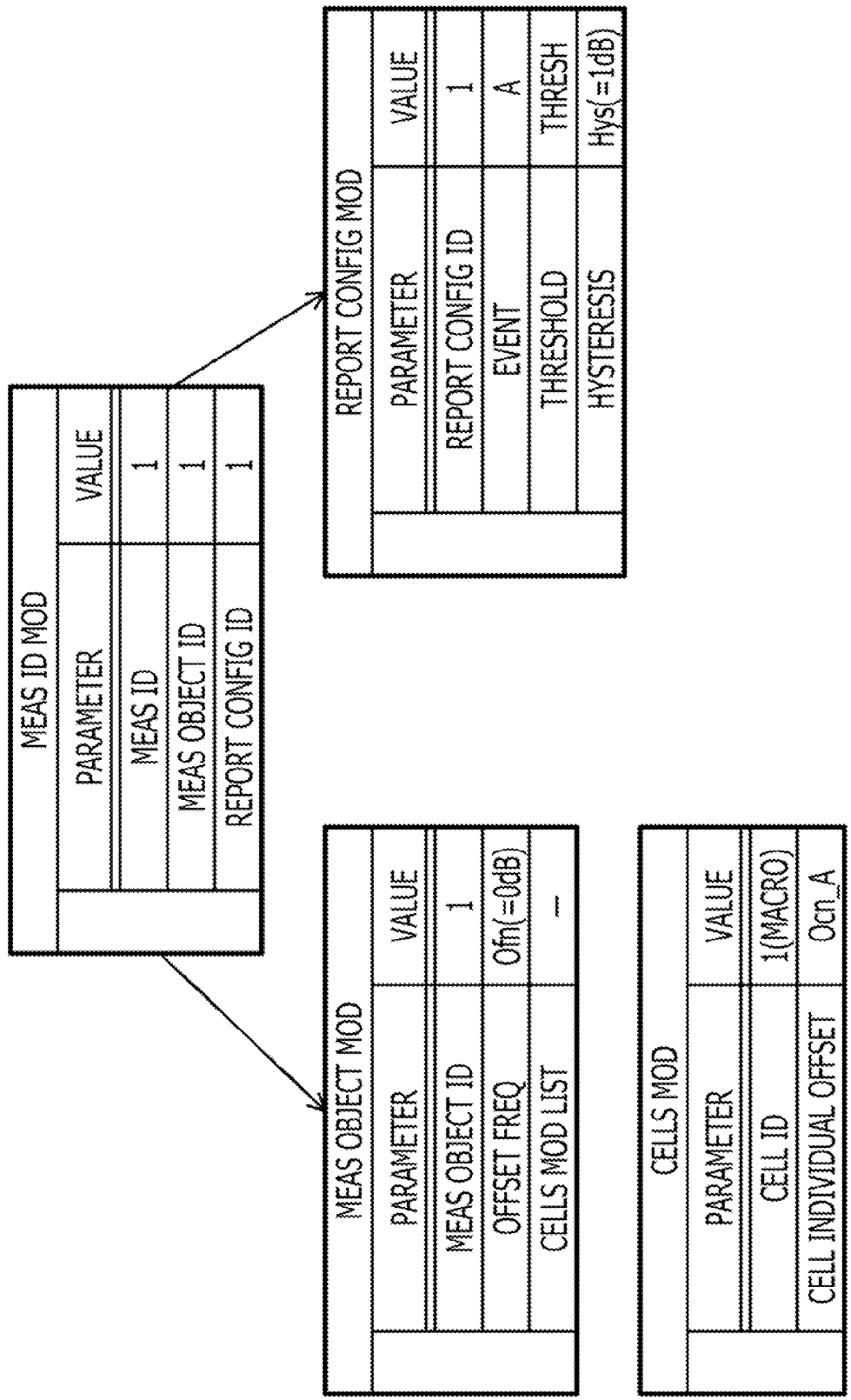
FIG. 27 illustrates an example of measurement report configuration information sent from a micro base station of the second embodiment to a mobile station that is connected to the micro base station.
Figure 28:
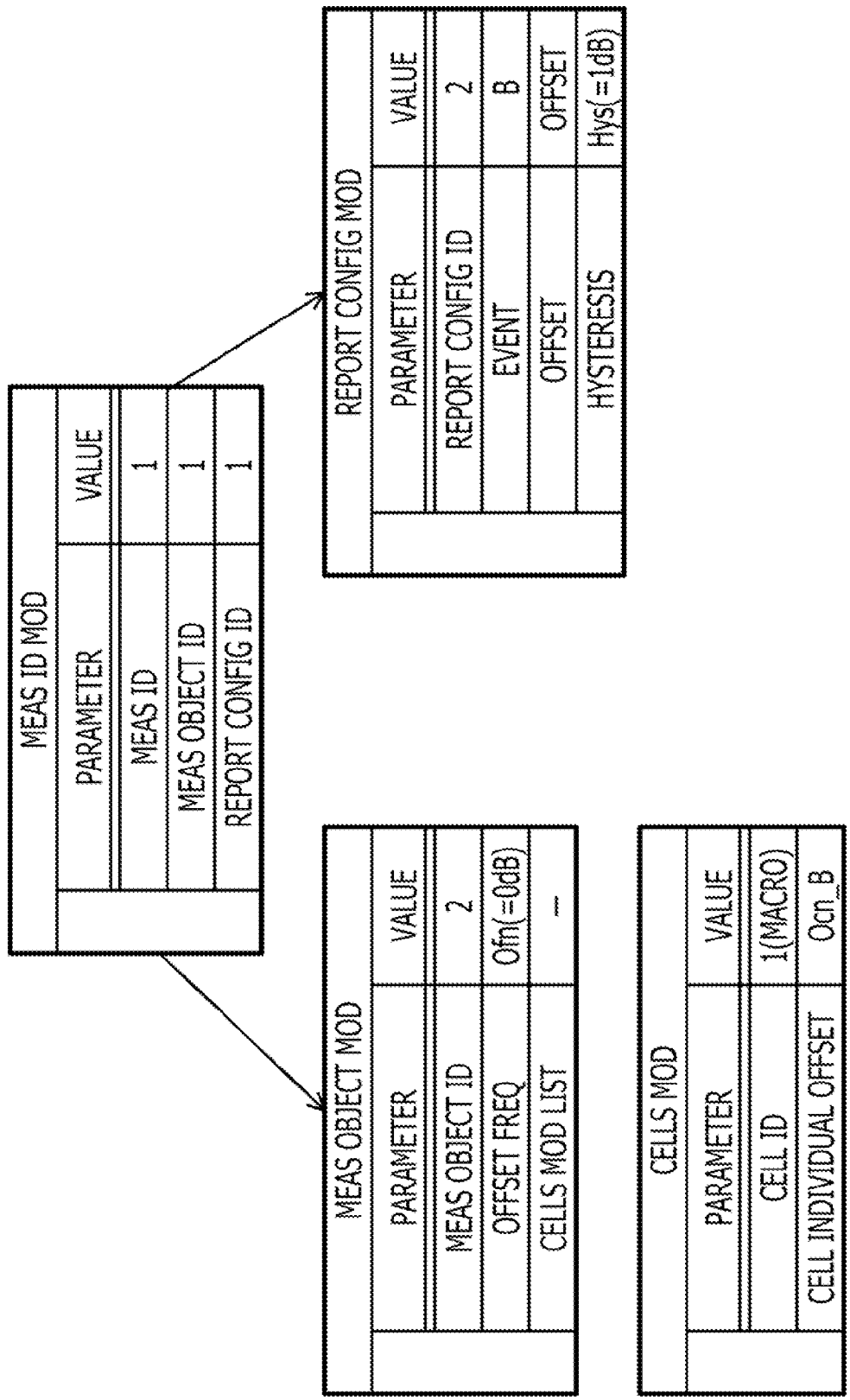
FIG. 28 illustrates an example of measurement report configuration information sent from the micro base station of the second embodiment to a mobile station that is connected to the micro base station.

FIGS. 27 and 28 illustrate example sets of measurement report configuration information sent from the micro base station to a mobile station that is connected to the micro base station. The configurations are the same as those in FIGS. 25 and 26, except that the macro base station cell is assigned (CellID=1) by CellMod in CellModList.

(B-2) Determining Measurement Report Transmission Conditions for Mobile Station

A method of determining measurement report transmission conditions of a mobile station on the basis of parameters in the measurement report configuration information will be described below with reference to FIGS. 29 to 33.

(B-2-1) Mobile Station Connected to Macro Base Station Cell

Figure 29:
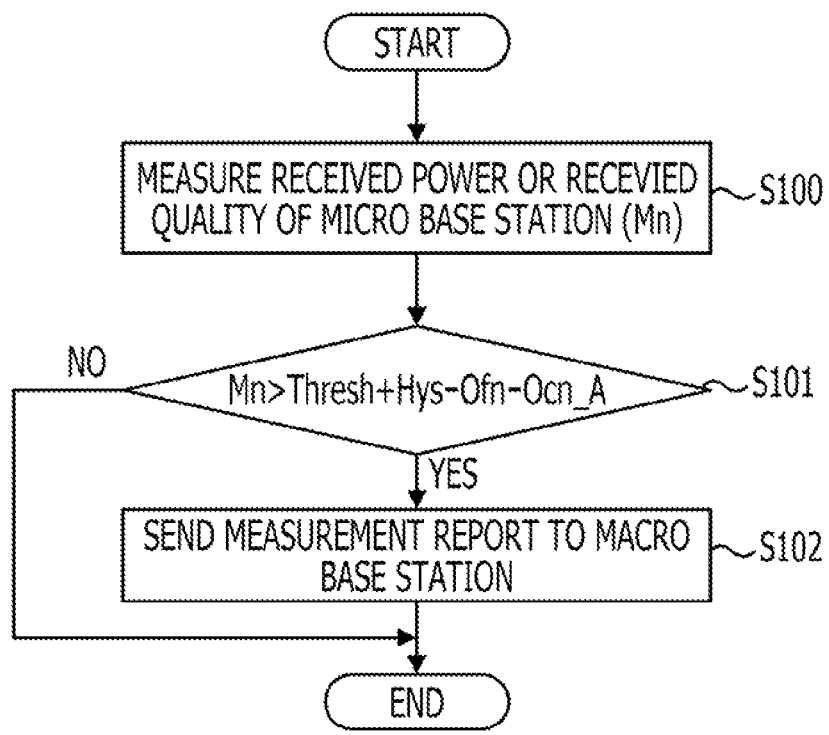
FIG. 29 is a flow chart illustrating the process carried out by a mobile station that is connected to a macro base station cell in the second embodiment to determine measurement report transmission conditions.

FIG. 29 is a flow chart illustrating the process carried out by a mobile station that is connected to the macro base station cell to determine the measurement report transmission conditions by referring to the measurement report configuration information illustrated in FIG. 25. As illustrated in FIG. 29, the mobile station measures the received power or the received quality of the micro base station cell (Step S100). Then, the mobile station determines whether the condition represented by Expression 5 is satisfied on the basis of the measured value Mn of received power or the received quality of the micro base station cell (Step S101). Thresh+Hys−Ofn−Ocn_A in Expression 5 is an example of a fifth threshold.

$$Mn > Thresh + Hys - Ofn - Ocn\_A \qquad (5)$$

When Expression 5 is satisfied, the mobile station sends a measurement report to the macro base station (Step S102) and then ends the process. When Expression 5 is not satisfied in Step S101, the mobile station ends the process.

Figure 30:
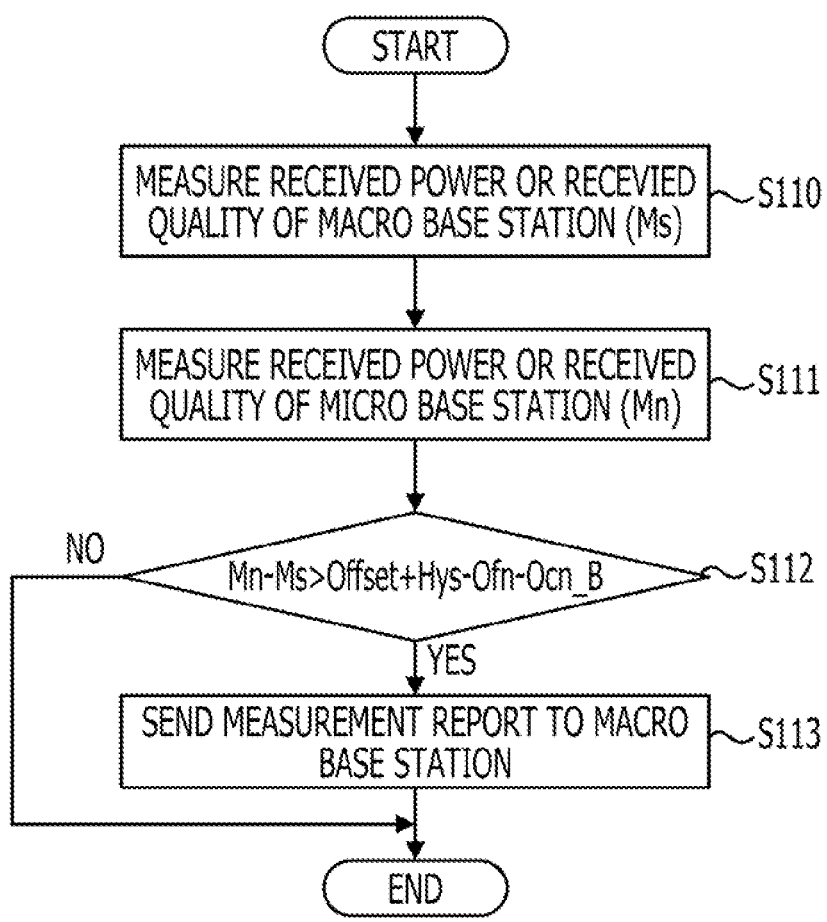
FIG. 30 is a flow chart illustrating the process carried out by a mobile station that is connected to a macro base station cell in the second embodiment to determine measurement report transmission conditions.

FIG. 30 is a flow chart illustrating the process carried out by a mobile station that is connected to the macro base station cell to determine the measurement report transmission conditions by referring to the measurement report configuration information illustrated in FIG. 26. As illustrated in FIG. 30, the mobile station measures the received power or the received quality of the macro base station cell (Step S110). Then, the mobile station measures the received power or the received quality of the micro base station cell (Step S111). Then, the mobile station determines whether the condition represented by Expression 6 is satisfied on the basis of the measured value Ms of received power or the received quality of the macro base station cell, the measured value Mn of the received power or the received quality of the micro base station cell, and the parameters in the measurement report configuration information (Step S112). Offset+Hys−Ofn−Ocn_B in Expression 6 is an example of a sixth threshold.

$$Mn - Ms > Offset + Hys - Ofn - Ocn\_B \qquad (6)$$

When Expression 6 is satisfied, the mobile station sends a measurement report to the macro base station (Step S113) and then ends the process. When Expression 6 is not satisfied in Step S112, the mobile station ends the process.

Figure 31:
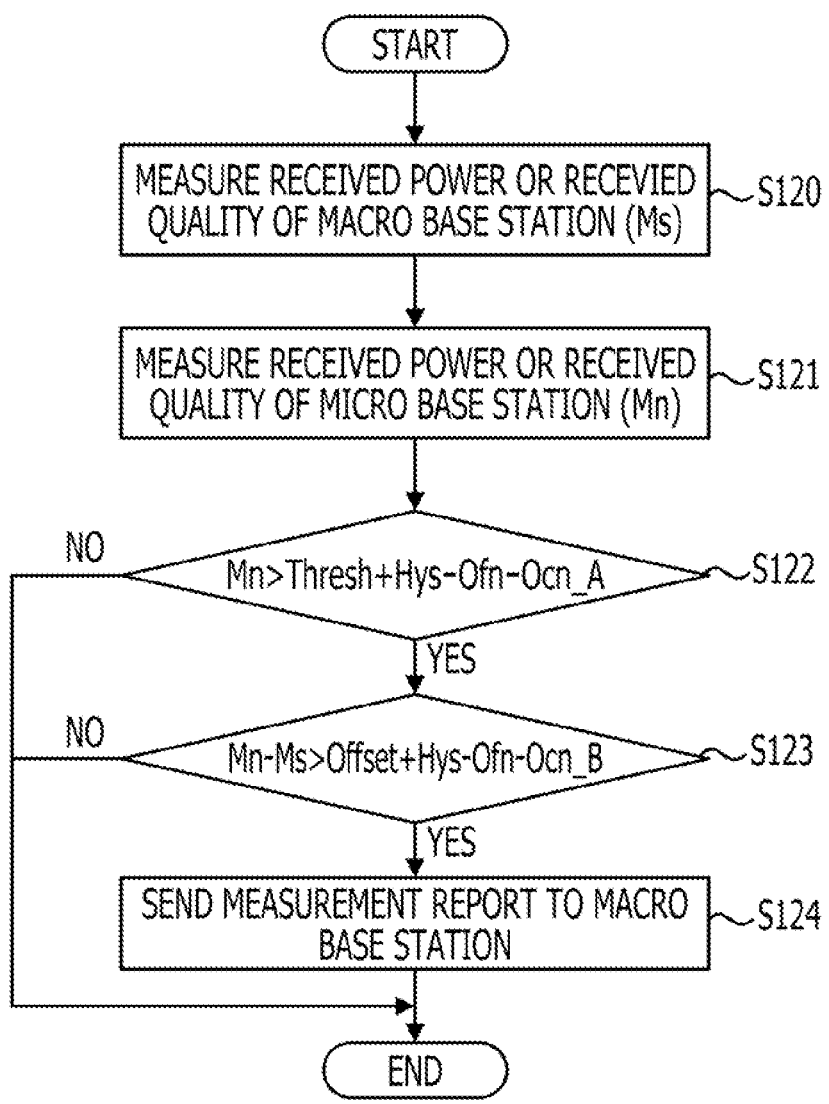
FIG. 31 is a flow chart illustrating the transmission of a measurement report in the second embodiment.

The flow charts in FIGS. 29 and 30 illustrate, whether a measurement report is transmitted (i.e., whether Expressions 5 and 6 are satisfied) is determined on the basis of each set of measurement report configuration information illustrated in FIGS. 25 and 26. Thus, measurement reports may be transmitted separately on the basis of the two sets of measurement report configuration information; if, however, Expressions 5 and 6 are both satisfied, a single measurement report may be transmitted. FIG. 31 is a flow chart illustrating such measurement report transmission.

As illustrated in FIG. 31, the mobile station first measures the received power or the received quality of the micro base station cell (Ms) (Step S120) and then measures the received power or the received quality of the micro base station cell (Mn) (Step S121). Then, the mobile station determines whether Expressions 5 and 6 are satisfied on the basis of Ms, Mn, and parameters in the measurement report configuration information (Steps S122 and S123). Only when Expressions 5 and 6 are both satisfied, the mobile station that is connected to the macro base station cell sends a measurement report to the macro base station (Step S124).

(B-2-2) Mobile Station Connected to Micro Base Station Cell

Figure 32:
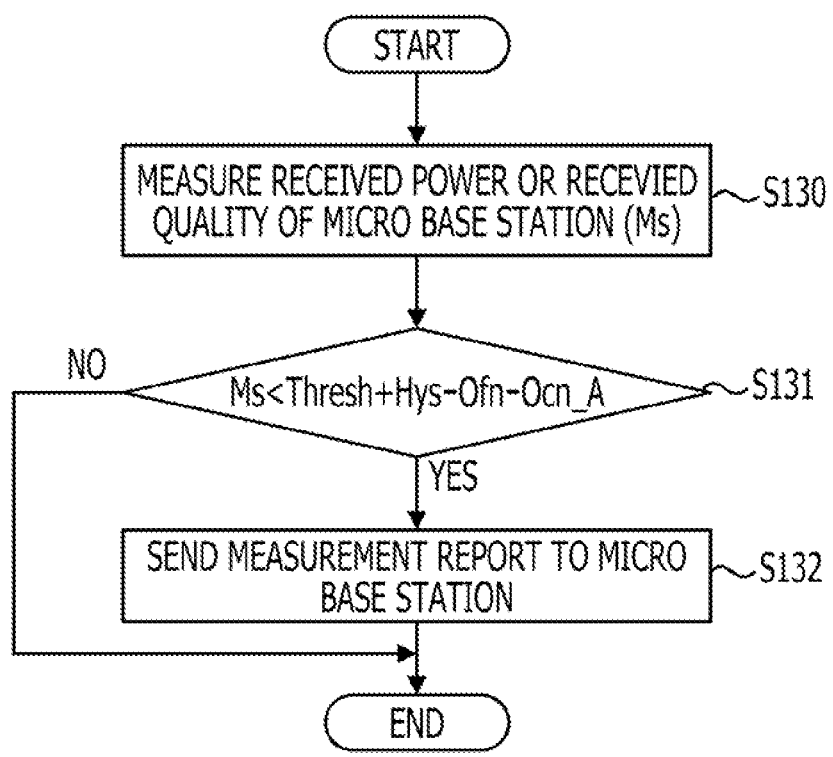
FIG. 32 is a flow chart illustrating the process carried out by a mobile station that is connected to the micro base station cell in the second embodiment to determine measurement report transmission conditions.

FIG. 32 is a flow chart illustrating the process carried out by a mobile station that is connected to the micro base station cell to determine the measurement report transmission conditions by referring to the measurement report configuration information illustrated in FIG. 32. As illustrated in FIG. 32, the mobile station measures the received power or the received quality of the micro base station cell (Step S130). Then, the mobile station determines whether the condition represented by Expression 7 is satisfied on the basis of the measured value Ms of received power or the received quality of the micro base station cell and the parameters in the measurement report configuration information (Step S131). Thresh−Hys−Ofn−Ocn_A in Expression 7 is an example of a seventh threshold.

$$Ms < Thresh - Hys - Ofn - Ocn\_A \qquad (7)$$

When Expression 7 is satisfied, the mobile station sends a measurement report to the macro base station (Step S132) and then ends the process. When Expression 7 is not satisfied in Step S131, the mobile station ends the process.

Figure 33:
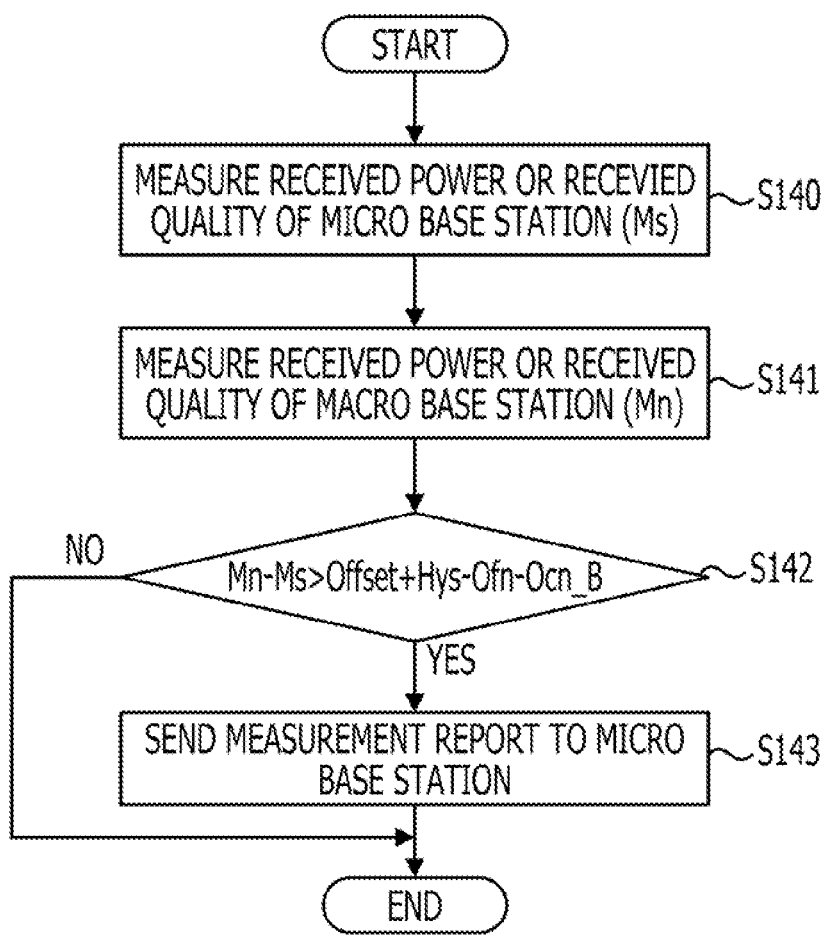
FIG. 33 is a flow chart illustrating the process carried out by a mobile station of the second embodiment that is connected to the micro base station cell to determine measurement report transmission conditions.

FIG. 33 is a flow chart illustrating the process carried out by a mobile station that is connected to the micro base station cell to determine the measurement report transmission conditions by referring to the measurement report configuration information illustrated in FIG. 26. As illustrated in FIG. 33, the mobile station measures the received power or the received quality of the micro base station cell (Step S140). Similarly, the mobile station measures the received power or the received quality of the macro base station cell (Step S141). Then, the mobile station determines whether the condition represented by Expression 8 is satisfied on the basis of the measured value Ms of received power or the received quality of the micro base station cell, the measured value Mn of received power or the received quality of the macro base station cell, and the parameters in the measurement report configuration information (Step S142). Offset+Hys−Ofn+Ocn_B in Expression 8 is an example of an eighth threshold.

$$Mn - Ms > Offset + Hys - Ofn + Ocn\_B \qquad (8)$$

When Expression 8 is satisfied, the mobile station sends a measurement report to the macro base station (Step S143) and then ends the process. When Expression 8 is not satisfied in Step S142, the mobile station ends the process. In other words, the mobile station, which is connected to the micro base station cell, sends a measurement report to the micro base station when Expression 7 or 8 is satisfied.

(B-3) Process by Base Stations that have Received Measurement Report

Figure 35:
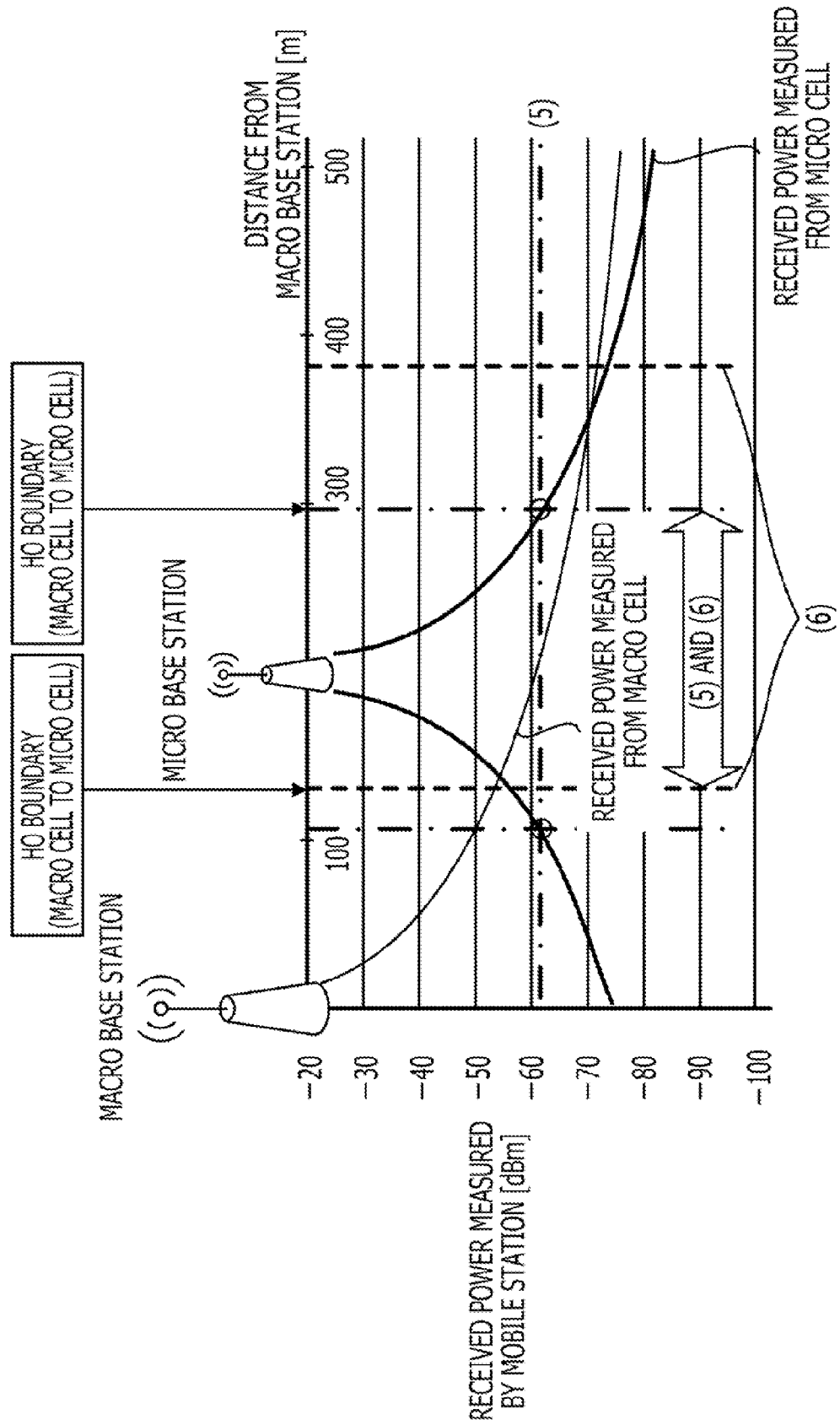
FIG. 35 illustrates handover boundaries of a mobile station handed over from the macro base station to the micro base station in a wireless communication system of the second embodiment.
Figure 36:
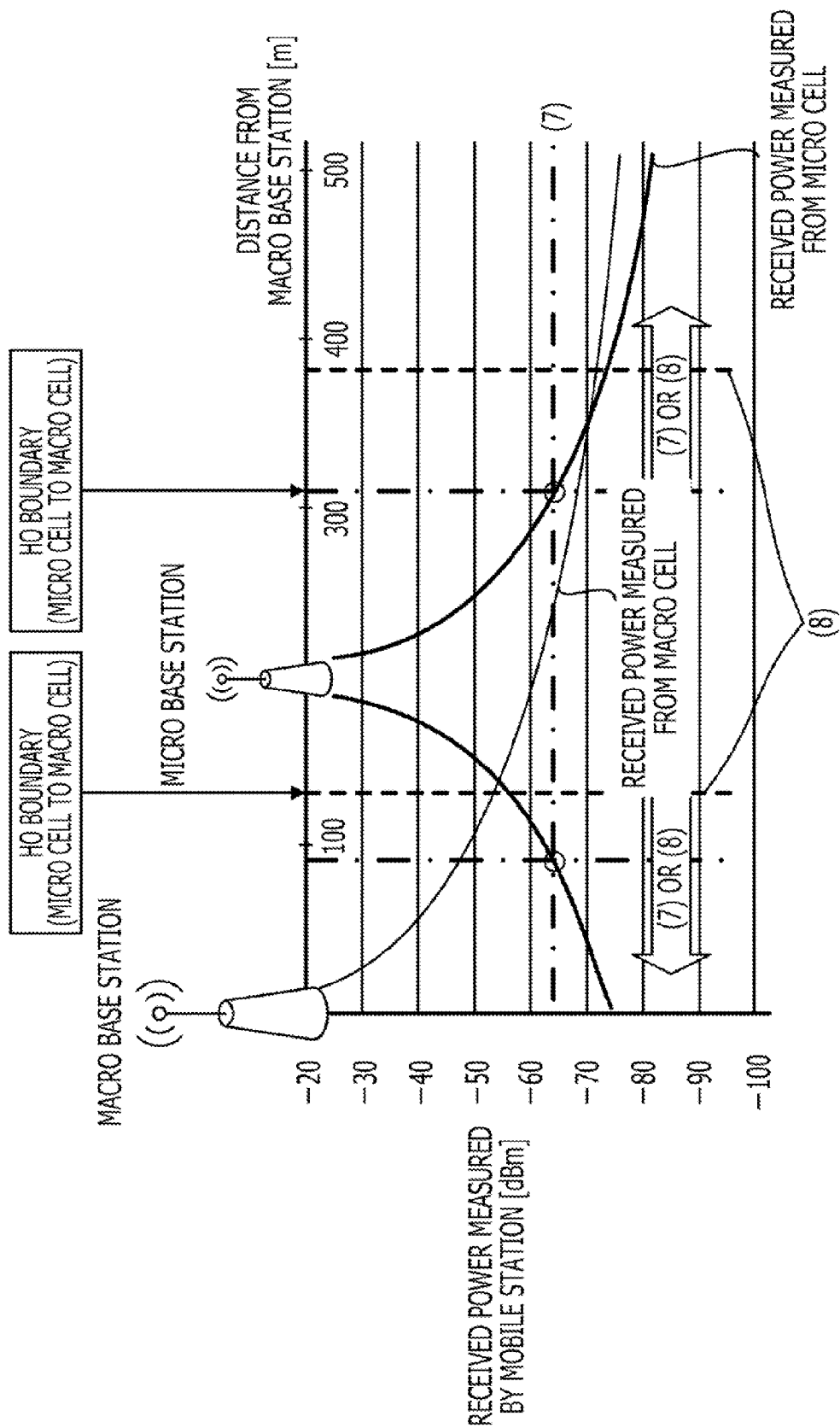
FIG. 36 illustrates handover boundaries of a mobile station handed over from the micro base station to the macro base station in a wireless communication system of the second embodiment.

The process carried out by the macro base station or the micro base station that have received a measurement report from the mobile station will be described below with reference to FIGS. 34 to 36.

(B-3-1) Macro Base Station

Figure 34:
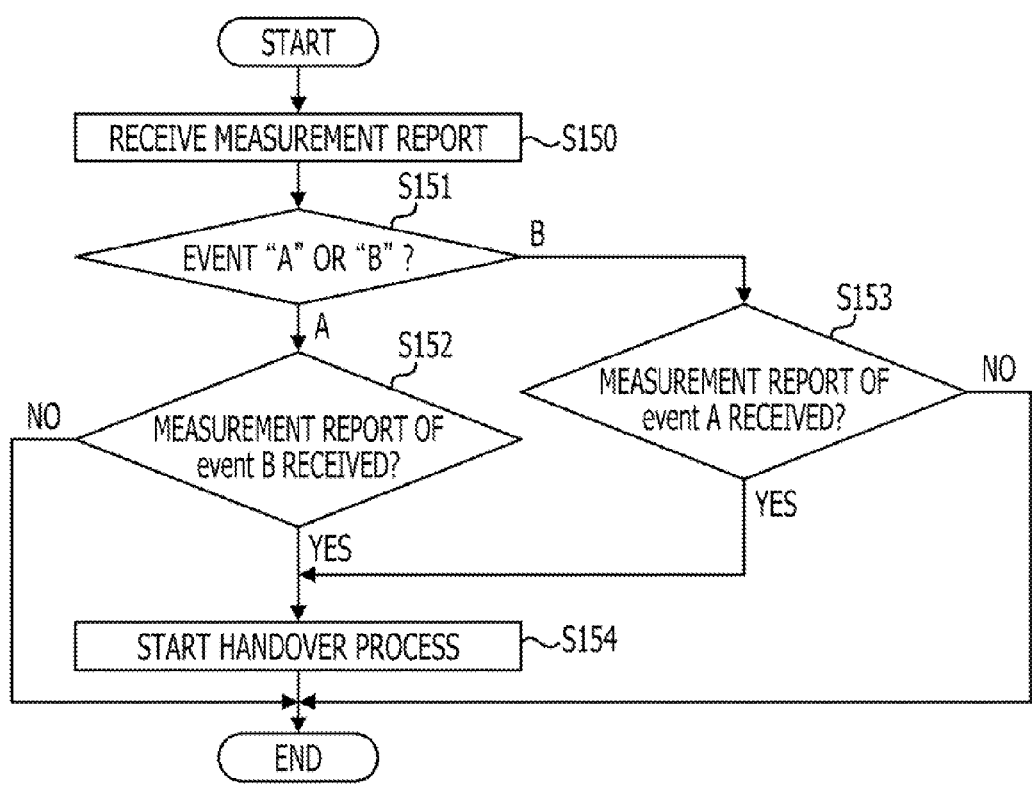
FIG. 34 is a flow chart illustrating the process carried out by the macro base station when a measurement report is sent from a mobile station in the second embodiment.

FIG. 34 is a flow chart illustrating the process carried out by the macro base station when a measurement report is sent from a mobile station.

As described above, a mobile station that is connected to the macro base station cell makes two separate measurements on the basis of two sets of measurement report configuration information. When the measurements match, the mobile station sends a measurement report to the macro base station. Upon receiving the measurement report (Step S150), the macro base station checks whether a measurement report of another event has been received. If the measurement report has been received, the handover process is started.

That is, as a result of checking an event in the received measurement report (Step S151), the macro base station starts the handover process (S154) if A is assigned to the event and if a measurement report in which B is assigned to the event has already been received (YES in Step S152). As a result of checking the event in the measurement report received in Step S150 (Step S151), the macro base station starts the handover process (S154) if B is assigned to the event and if a measurement report in which A is assigned to the event has already been received (YES in S153).

(B-3-2) Micro Base Station

In the process (not shown) carried out by the micro base station when a measurement report is sent from a mobile station, the micro base station starts the handover process when A or B is assigned to the event in the received measurement report.

As described above, in the wireless communication system of this embodiment, the handover process of a mobile station is carried out as described below on the basis of a determination result of the measurement report transmission conditions of the mobile station and the processing by the base stations. That is, a mobile station that is connected to the macro base station cell is handed over from the macro base station cell to the micro base station cell when Expressions 5 and 6 are both satisfied. A mobile station that is connected to the micro base station cell is handed over from the micro base station to the macro base station when Expression 7 or 8 is satisfied. FIGS. 35 and 36 illustrate such handover conditions applied to FIG. 2. FIG. 35 illustrates handover (HO) boundaries of a mobile station handed over from the macro base station to the micro base station. FIG. 36 illustrates handover (HO) boundaries of a mobile station handed over from the micro base station to the macro base station. In FIG. 35, the line of the fifth threshold (Thresh+Hys−Ofn−Ocn_A) in Expression 5 and the line of the sixth threshold (Offset+Hys−Ofn−Ocn_B) in Expression 6 are illustrated. In FIG. 36, the line of the seventh threshold (Thresh−Hys−Ofn−Ocn_A) in Expression 7 and the line of the eighth threshold (Offset+Hys−Ofn+Ocn_B) in Expression 8 are illustrated. It is apparent from FIGS. 35 and 36 that, by updating Ocn_A and/or Ocn_B, the HO boundaries can be moved to the left and right in FIGS. 35 and 36 in response to the load on the macro base station and the micro base station.

(B-4) Method of Updating Measurement Report Configuration Information

In this embodiment, a method of updating measurement report configuration information is basically the same as that described in the first embodiment (A-4). That is, the macro base station and the micro base station send and receive predetermined messages between each other in response to the load factor of their own cells and are capable of updating the measurement report configuration information. In this embodiment, Ocn_A and Ocn_B in the measurement report configuration information of the macro base station cell and Ocn_A and Ocn_B in the measurement report configuration information of the micro base station cell are the targets of the update.

(B-5) Details of Process Carried Out when Load on Macro Base Station is High With reference to FIGS. 37 to 39, the process handing over a mobile station from a macro base station to a micro base station in order to balance the load on the macro base station and the micro base station when the load on the macro base station is high will be described below.

Figure 37:
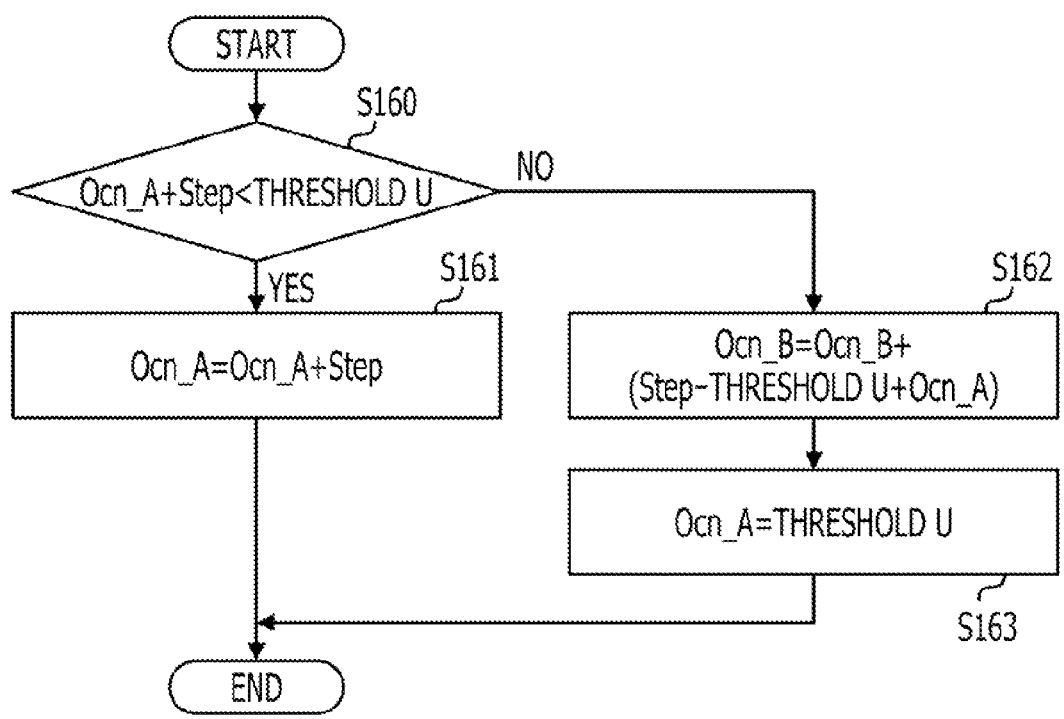
FIG. 37 is a flow chart illustrating an example process of updating parameters in the measurement report configuration of the macro base station cell and the micro base station cell in the second embodiment.

FIG. 37 is a flow chart illustrating the process of updating Ocn_A and Ocn_B in the measurement report configuration of the macro base station cell and the micro base station cell. Ocn_A in the measurement report configuration is preferentially updated. That is, as illustrated in FIG. 38, Ocn_A is increased through the update, and handover of a mobile station is promoted such that the mobile station that is positioned near one of the two HO boundaries further from the macro base station is handed over to the micro base station cell. The radio propagation loss of the mobile station far away from the macro base station is large; therefore, to carry out AMC, an MCS having low throughput must be selected between the macro base station and the mobile station at a far position. Such a mobile station should be handed over to a micro base station as quickly as possible.

With reference to FIG. 37, if the Ocn_A value does not exceed the threshold U (system value) when increased by a step (YES in Step S160), the Ocn_A value is increased by a step (Step S161). If the Ocn_A value exceeds the threshold U in Step S160, i.e., if the upper limit is exceeded when a step is added to the Ocn_A value (NO in Step S160), Ocn_B is decreased by a step (Step S162), and Ocn_A is fixed at the threshold U (Step S163). Subsequently, Ocn_B is decreased one step at a time.

Figure 38:
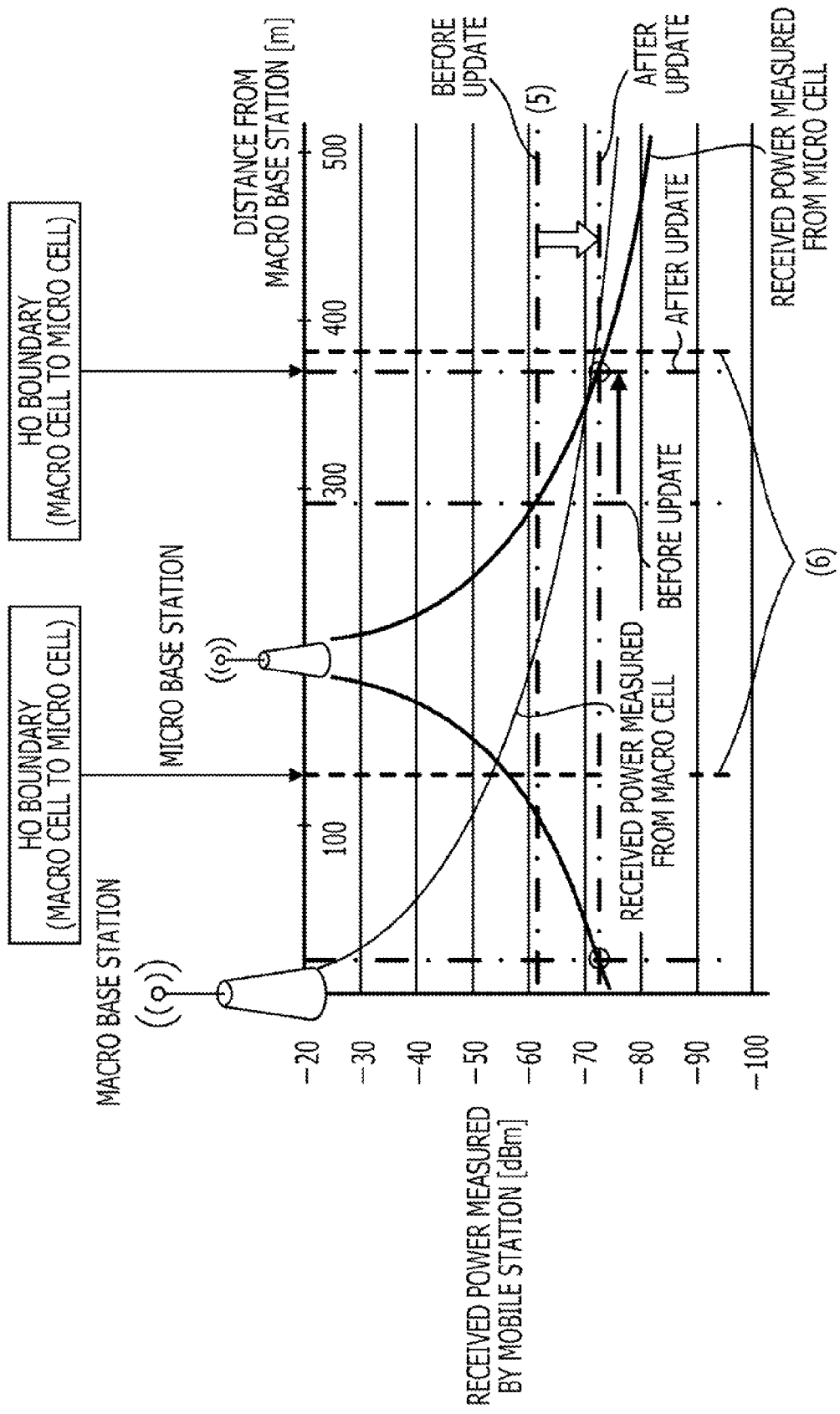
FIG. 38 illustrates the displacement of handover boundaries of a mobile station handed over from the macro base station cell to the micro base station cell when a parameter (Ocn_A) value is increased through an update in the wireless communication system of the second embodiment.

FIG. 38 illustrates the displacement of the HO boundaries of the mobile station handed over from the macro base station to the micro base station when the Ocn_A value is increased through an update. Ocn_A is a parameter in Expression 5; a large Ocn_A value decreases the value of the right term of Expression 5. In this way, the fifth threshold of the received power or received quality of the micro base station cell becomes small for the mobile station connected to the macro base station cell. In other words, line (5) in FIG. 38 is lowered. Through such an update, the HO boundary on the right side of the micro base station moves toward the right in FIG. 38. Thus, by increasing Ocn_A through the update, transmission of a measurement report from the mobile station, which is connected to the macro base station cell positioned between the original HO boundary and the displaced HO boundary, is expected. The macro base station, which has received the measurement report from the mobile station, can start the process of handing over the mobile station to the micro base station cell.

When the Ocn_A value is increased through the update, the HO boundary on the left side of the micro base station does not move substantially. This is because, on the left side of the micro base station, the difference in the received power or received quality of the macro base station and the micro base station is large.

Figure 39:
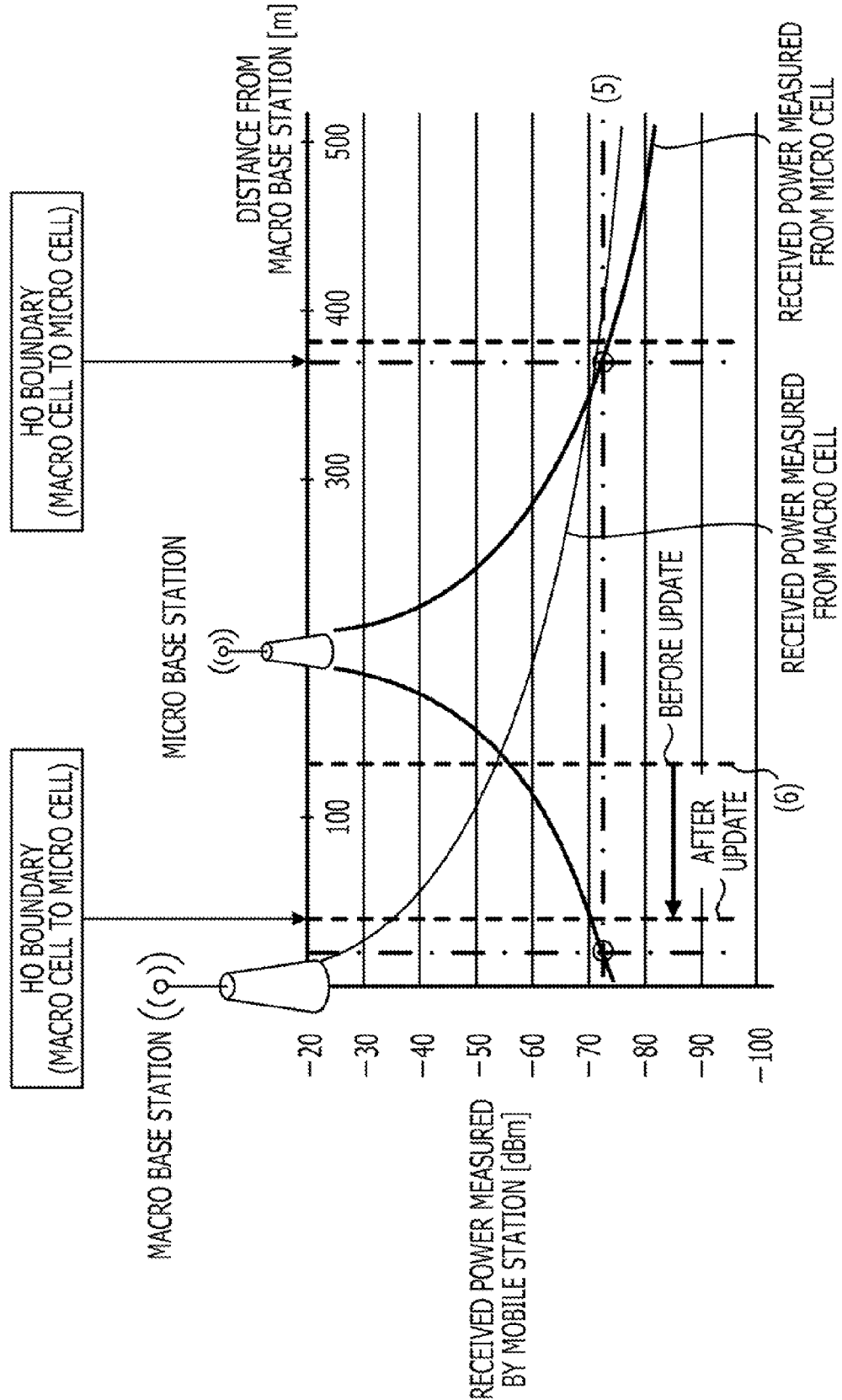
FIG. 39 illustrates the displacement of handover boundaries of a mobile station handed over from the macro base station cell to the micro base station cell when a parameter (Ocn_B) value is increased through an update in the wireless communication system of the second embodiment.

FIG. 39 illustrates the displacement of the HO boundaries of the mobile station handed over from the macro base station to the micro base station when the Ocn_B value is increased through an update. Ocn_B is a parameter in Expression 6; a large Ocn_B value decreases the value of the right term of Expression 6. In this way, the sixth threshold for the difference between the received power or received quality of the macro base station cell and the received power or received quality of the micro base station cell becomes small for the mobile station that is connected to the macro base station cell. In other words, among the two vertical lines (6) in FIG. 39, the line on the left moves further left and the line on the right moves further right. Since the HO boundary on the right side of the micro base station is set by Expression 5, only the area on the left side of the micro base station is enlarged as an area satisfying both Expression 5 and 6 by updating the Ocn_B value. That is, only the HO boundary on the left side of the micro base station moves toward the left. Through such displacement of the HO boundary, it is expected that a measurement report be sent to a mobile station near the macro base station. The macro base station that has received a measurement report from the mobile station can start the process of handing over the mobile station to the micro base station cell.

FIGS. 38 and 39 illustrate the displacement of the HO boundaries of the mobile station handed over from the macro base station cell to the micro base station cell; the displacement of the HO boundaries of the mobile station handed over from the micro base station cell to the macro base station cell is the same as that illustrated in FIGS. 38 and 39.

As described above, in the wireless communication system according to this embodiment, by increasing Ocn_A through preferential update when the load on the micro base station cell is high, the HO boundary on the right side of the micro base station (far away from the macro base station) is displaced. In this way, it is possible to start the process of preferentially handing over the mobile station, which is connected to the macro base station cell near the HO boundary, to the micro base station cell. Since the electric power or the reception quality of the reference signal received by the mobile station, which has been handed over from the macro base station cell to the micro base station cell, is substantially the same before and after the handover, load transition with excellent frequency use efficiency can be carried out.

When Ocn_A reaches the upper limit, the HO boundary in the area between the macro base station and the micro base station (i.e., HO boundary closer to the macro base station) is displaced by increasing Ocn_B through the update. As a result of this displacement, the process of handing over the mobile station, which is connected to the macro base station cell near the macro base station, to the micro base station cell can be started. In this way, when the load on the macro base station cell is extremely high, it is possible to reduce the load on the macro base station cell by maximizing the frequency use of the micro base station cell.

(B-6) Process Carried Out when Load on Micro Base Station is High

The process of handing over a mobile station from the micro base station to the macro base station in order to balance the load on the macro mobile station and the micro base station when the load on the micro base station is high will be described below.

Figure 40:
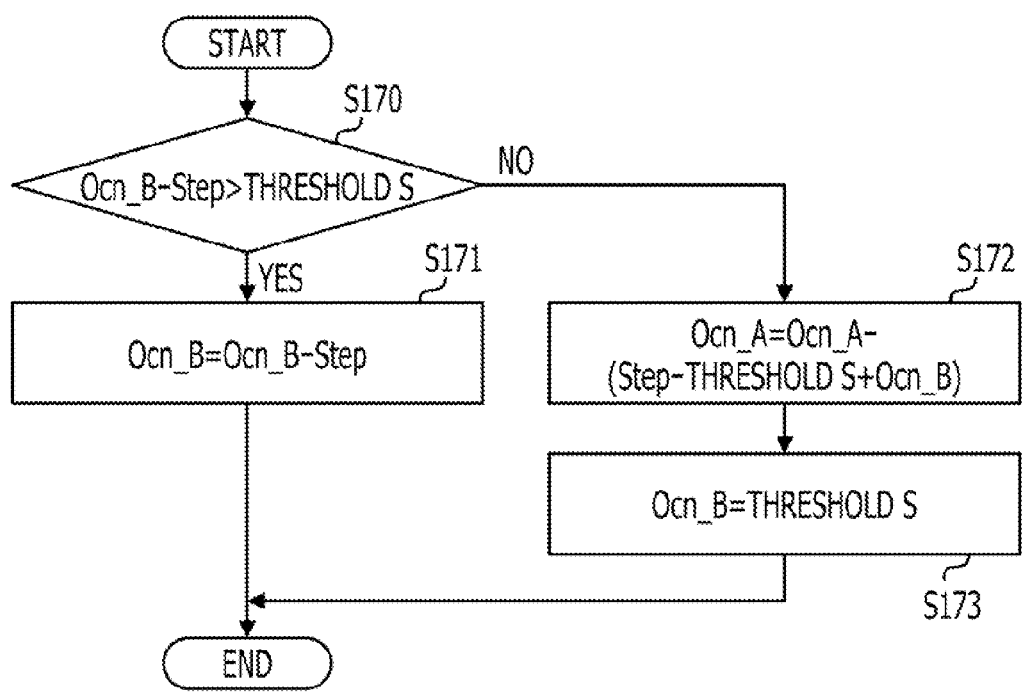
FIG. 40 is a flow chart illustrating an example process of updating parameters in the measurement report configuration of the macro base station cell and the micro base station cell in the second embodiment.
Figure 41:
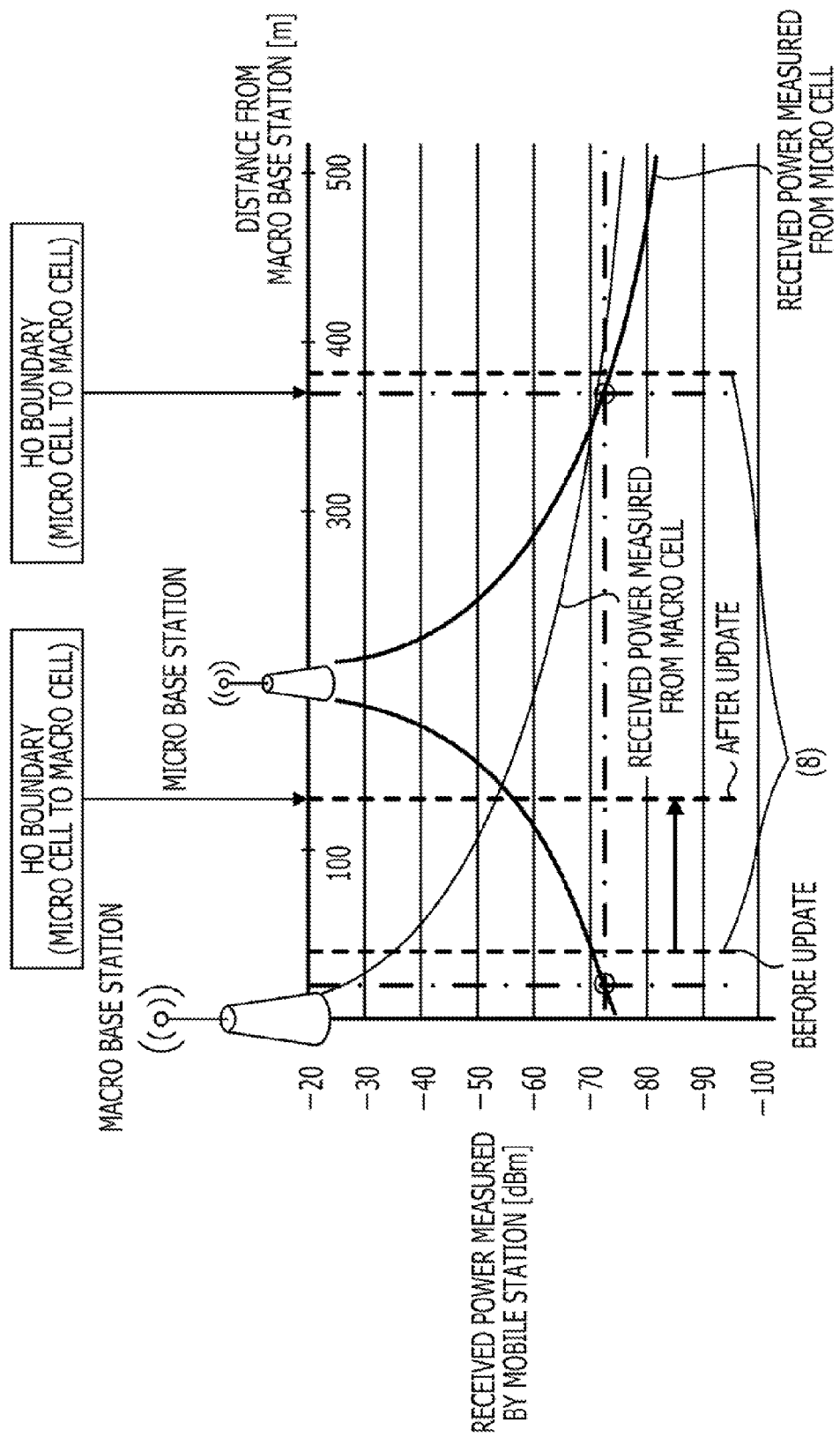
FIG. 41 illustrates the displacement of handover boundaries of a mobile station handed over from the micro base station cell to the macro base station cell when a parameter (Ocn_B) value is decreased through an update in the wireless communication system of the second embodiment.

FIG. 40 is a flow chart illustrating the process of updating Ocn_A and Ocn_B in the measurement report configurations of the macro base station cell and the micro base station cell. Ocn_B in the measurement report configuration is preferentially updated. That is, as illustrated in FIG. 41, Ocn_B is decreased through the update, and handover of a mobile station is promoted such that the mobile station that is connected to the macro base station cell and positioned near one of the two HO boundaries closer to the macro base station is handed over to a micro base station cell. Since the received power or the received quality is satisfactory after the mobile station that is positioned close to the macro base station is handed over to the macro base station cell, an MCS having high throughput can be selected for the macro base station, which is the handover destination. Hence, the overall frequency use efficiency is satisfactory.

FIG. 41 illustrates the displacement of the HO boundaries of the mobile station handed over from the micro base station to the macro base station when the Ocn_B value is decreased through an update. Ocn_B is a parameter in Expression 8; a small Ocn_B value decreases the value of the right term of Expression 8. In this way, the eighth threshold for the difference of the received power or received quality of the macro base station cell and the received power or received quality of the micro base station cell becomes small for the mobile station that is connected to the micro base station cell. In other words, among the two vertical lines (8) (HO boundaries) in FIG. 41, the line on the left moves toward the right and the line on the right moves toward the left. Through such displacement of the HO boundaries, transmission of measurement reports from the mobile stations, which are connected to micro base stations cells positioned between the HO boundaries at the original positions and the HO boundaries after displacement, is expected. The micro base stations, which have received the measurement reports from the mobile stations, can start the process of handing over the mobile station to the macro base station.

Figure 42:
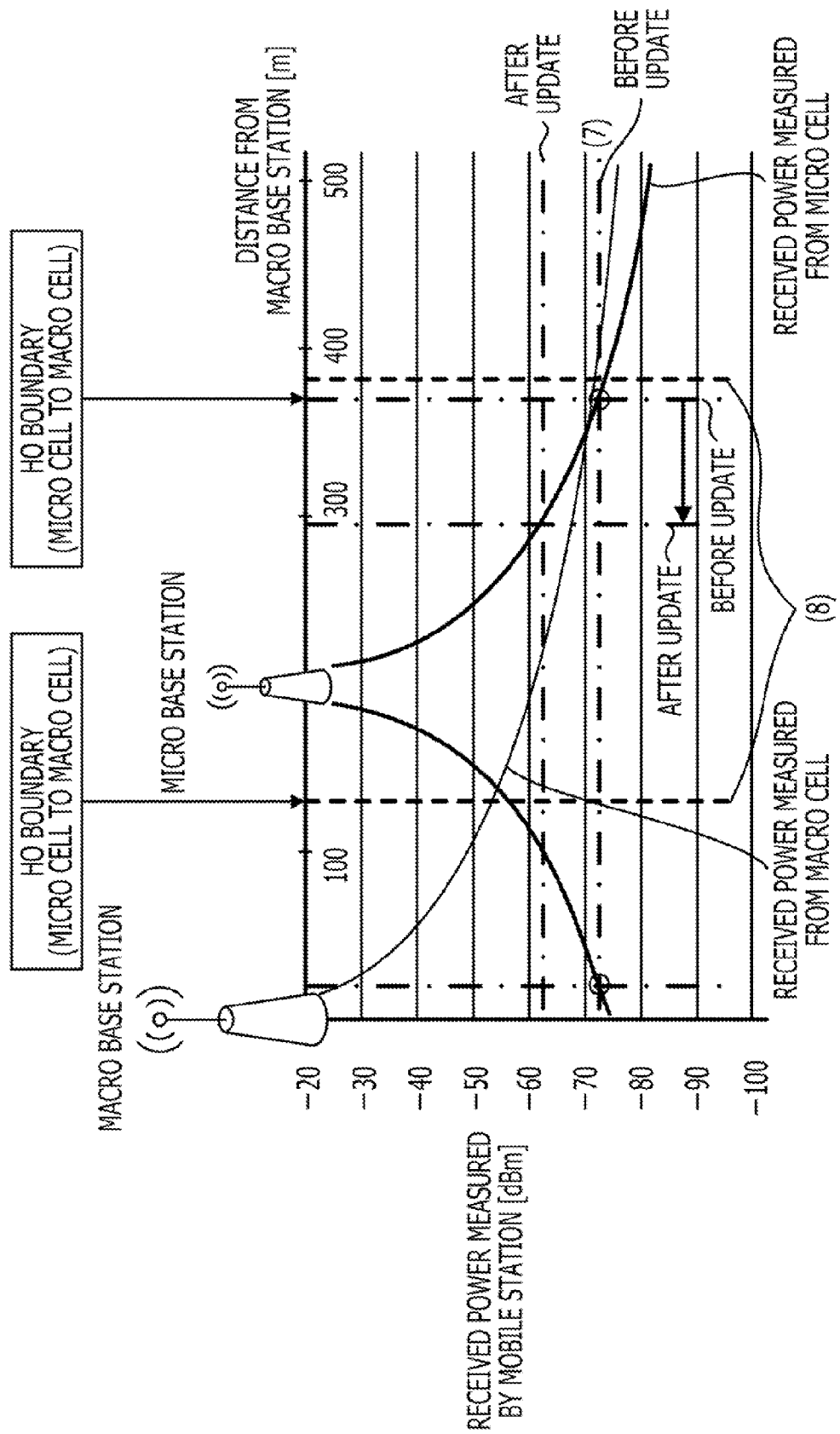
FIG. 42 illustrates the displacement of handover boundaries of a mobile station handed over from the micro base station cell to the macro base station cell when a parameter (Ocn_A) value is decreased through an update in the wireless communication system of the second embodiment.

FIG. 42 illustrates the displacement of the HO boundaries of the mobile station handed over from the micro base station to the macro base station when the Ocn_A value is decreased through an update. Ocn_A is a parameter in Expression 7; a small Ocn_A value increases the value of the right term of Expression 7. In this way, the seventh threshold of the received power or received quality of the micro base station cell becomes large for the mobile station that is connected to the micro base station cell. In other words, line (7) in FIG. 42 is raised. Through such an update, the HO boundary on the right side of the micro base station moves toward the left in FIG. 42. Thus, by decreasing Ocn_A through the update, transmission of a measurement report from the mobile station, which is connected to the macro base station cell positioned between the original HO boundary and the displaced HO boundary, is expected. The macro base station, which has received the measurement report from the mobile station, can start the process of handing over the mobile station to the micro base station.

FIGS. 41 and 42 illustrate the displacement of the HO boundaries of the mobile station handed over from the micro base station cell to the macro base station cell; the displacement of the HO boundaries of the mobile station handed over from the macro base station cell to the micro base station cell is the same as that illustrated in FIGS. 41 and 42.

In the first and second embodiments, a method of balancing load by changing the thresholds of the measurement report conditions was exemplified with the precondition that the macro base station or micro base station hands over the mobile station upon receiving a measurement report from the mobile station. Instead, for example, as another embodiment, information about the received power or received quality of reference signals from the macro base station cell and the micro base station cell may be contained in the measurement report sent from the mobile station, and the macro base station and the micro base station may hand over the mobile station on the basis of the such information. In such a case, information equivalent to the above-described measurement report condition is controlled by the macro base station and the micro base station, and the measurement report conditions according to the first and second embodiments are changed in the information controlled by the macro base station and the micro base station to enable control equivalent to that according to the first and second embodiments.

Details of embodiments according to the present invention have been described above. The method of distributing load and the base stations are not limited to those in the above-described embodiments, and various improvements and modifications may be made within the scope of the invention.

An example of a hardware configuration of each of the base stations is described. A wireless interface (IF) is an interface device that is used to perform wireless communication with a mobile station. A processor is a device that processes data. Examples of the processor are a central processing unit (CPU) and a digital signal processor (DSP). A memory is a device that stores data. Examples of the memory are a read only memory (ROM) and a random access memory (RAM). A logical circuit is an electronic circuit that performs a logical operation. Examples of the logical circuit are a large scale integration (LSI), a field-programming gate array (FPGA) and an application specific integrated circuit (ASIC). A wired IF is an interface device that is used to perform wired communication with another base station, the management device and the like, which are connected to a network (so-called backhaul network) located on the side of a network of a mobile phone system. The base stations may each use the wireless IF and perform wireless communication with another wireless base station and the like that are connected to the backhaul network.

Correspondence relationships between the base station illustrated in FIG. 22 and the hardware configuration are described as follows. The wireless IF corresponds to the antenna 16 and duplexer 15, for example. The processor and the logical circuit correspond to the packet identification unit 11, the packet buffer unit 12, the PDU generating unit 13, the transmission unit 14, the reception unit 17, the control-information extracting unit 18, the packet generating unit 19, and the control unit 20, for example. The memory corresponds to the storage unit 21, for example. The wired IF corresponds to the network (NW) interface unit 10.

An example of a hardware configuration of each of the mobile stations is described. A wireless interface (IF) is an interface device that is used to perform wireless communication with a base station. A processor is a device that processes data. Examples of the processor are a central processing unit (CPU) and a digital signal processor (DSP). A memory is a device that stores data. Examples of the memory are a read only memory (ROM) and a random access memory (RAM). A logical circuit is an electronic circuit that performs a logical operation. Examples of the logical circuit are a large scale integration (LSI), a field-programming gate array (FPGA) and an application specific integrated circuit (ASIC).

Correspondence relationships between the mobile station illustrated in FIG. 23 and the hardware configuration are described as follows. The wireless IF corresponds to the antenna 35 and duplexer 34, for example. The processor and the logical circuit correspond to the packet generating unit 31, the PDU generating unit 32, the transmission unit 33, the reception unit 36, the control-information extracting unit 37, the reference-signal extracting unit 38, measurement unit 39, and the control unit 40, for example. The memory corresponds to the storage unit 41, for example.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention(s) has (have) been described in detail, it should be understood that the various changes, substitutions, and alterations could be made hereto without departing from the spirit and scope of the invention.

What is claimed is:

1. A method of distributing load for a wireless communication, the method comprising:

setting a first index value representing levels of received power or received quality of reference signals from a first base station covering a first area, and a second index value representing levels of received power or received quality of reference signals from a second base station covering a second area inside the first area;

handing over a mobile station assigned to the first base station to the second base station when the first index value is smaller than a first threshold and when the second index value is larger than a second threshold;

handing over a mobile station assigned to the second base station to the first base station when the second index value is smaller than a third threshold or when the first index value is larger than a fourth threshold; and decreasing, when the load on the first base station is to be reduced, the second threshold and the third threshold by degrees respectively, and increasing, when the second threshold reaches a second lower limit and the third threshold reaches a third lower limit, the first threshold and the fourth threshold by degrees.

2. The method of distributing load according to claim 1, further comprising:

decreasing, when the load on the second base station is to be reduced, the first threshold and the fourth threshold by degrees respectively, and increasing, when the first threshold reaches a first lower limit and the fourth threshold reaches a fourth lower limit, the second threshold and the third threshold by degrees.

3. The method of distributing load according to claim 1, wherein at least one of the first base station and the second base station sends at least the one of the first threshold being increased, the second threshold being decreased, the third threshold being decreased, and the fourth threshold being increased, to the mobile stations.

4. A method of distributing load for a wireless communication, the method comprising:

setting a first index value representing levels of received power or received quality of reference signals from a first base station covering a first area, and a second index value representing levels of received power or received quality of reference signals a second base station covering a second area inside the first area;

handing over a mobile station assigned to the first base station to the second base station when the second index value is larger than a fifth threshold and when a difference between the second index value and the first index value is larger than a sixth threshold;

handing over a mobile station assigned to the second base station to the first base station when the second index value is smaller than a seventh threshold or when the difference of the first index value and the second index value is larger than an eighth threshold; and decreasing, when the load on the first base station is to be reduced, the fifth threshold and the seventh threshold by degrees respectively, and when the fifth threshold and the seventh threshold reach a fifth lower limit and seventh lower limit respectively, decreasing the sixth threshold, and increasing the eighth threshold.

5. The method of distributing load according to claim 4, further comprising:
increasing, when the load on the second base station is to be reduced, the sixth threshold by degrees, decreasing the eighth threshold by degrees, and then increasing the fifth threshold and the seventh threshold by degrees.

6. The method of distributing load according to claim 4, wherein at least one of the first base station and the second base station sends at least one of the fifth threshold being decreased, the sixth threshold being decreased, the seventh threshold being decreased, and the eighth threshold be increased adjusted thresholds to the mobile stations by degrees.

7. A first base station covering a first area and capable of handing over a mobile station to and from a second base station covering a second area inside the first area, the first base station comprising:
a wireless communication interface configured to communicate with a mobile station; and
a processor configured
to hand over the mobile station assigned to the first base station covering a first area to a second base station covering a second area inside the first area when a first index value representing levels of received power or received quality of reference signals from the first base station is smaller than a first threshold and a second index value representing levels of received power or received quality of reference signals from the second base station is larger than a second threshold; and
to decrease when the load on the first base station is to be reduced, the second threshold by degrees, and increase, when the second threshold reaches a second lower limit the first threshold by degrees.

8. The first base station according to claim 7, wherein
the processor is further configured to control the wireless interface to transmit the increased first threshold or decreased second threshold to the mobile stations connected to the first base station.

9. The method according to claim 1, wherein the first threshold, the second threshold, the third threshold and the fourth threshold are calculated based on a transmission condition values, a hysteresis value of peripheral cells and an offset value for an individual cell.

10. The method according to claim 4, wherein the fifth threshold, the sixth threshold, the seventh threshold and the eight threshold are calculated based on a transmission condition values, a hysteresis value of peripheral cells and an offset value for an individual cell.

11. The first base station according to claim 7,
wherein the first threshold and the second threshold are calculated based on a transmission condition values, a hysteresis value of peripheral cells and an offset value for an individual cell.

\* \* \* \* \*